United States Patent
Borello et al.

(10) Patent No.: US 12,493,543 B2
(45) Date of Patent: Dec. 9, 2025

(54) DYNAMIC INSTRUMENTATION TO CAPTURE CLEARTEXT FROM TRANSFORMED COMMUNICATIONS

(71) Applicant: Sysdig, Inc., San Francisco, CA (US)

(72) Inventors: Gianluca Borello, Davis, CA (US); Loris Degioanni, Davis, CA (US)

(73) Assignee: Sysdig, Inc., San Francisco, CA (US)

( * ) Notice: Subject to any disclaimer, the term of this patent is extended or adjusted under 35 U.S.C. 154(b) by 1077 days.

(21) Appl. No.: 17/515,081

(22) Filed: Oct. 29, 2021

(65) Prior Publication Data

US 2023/0136524 A1  May 4, 2023

(51) Int. Cl.
| | | |
|---|---|---|
| G06F 11/362 | (2025.01) | |
| G06F 8/41 | (2018.01) | |
| G06F 9/455 | (2018.01) | |
| G06F 9/54 | (2006.01) | |

(52) U.S. Cl.
CPC ............ *G06F 11/3644* (2013.01); *G06F 8/41* (2013.01); *G06F 9/45558* (2013.01); *G06F 2009/45591* (2013.01); *G06F 9/544* (2013.01); *G06F 9/545* (2013.01)

(58) Field of Classification Search
CPC .... G06F 11/3644; G06F 8/41; G06F 9/45558; G06F 9/545; G06F 9/544; G06F 8/14
See application file for complete search history.

(56) References Cited

U.S. PATENT DOCUMENTS

| | | | |
|---|---|---|---|
| 6,026,235 A | 2/2000 | Shaughnessy | |
| 6,370,639 B1 | 4/2002 | Huck et al. | |
| 10,747,510 B1 * | 8/2020 | Lundeen | G06F 8/44 |
| 2007/0006159 A1 * | 1/2007 | Hecht | G06F 11/3644 |
| | | | 717/124 |
| 2015/0120985 A1 | 4/2015 | Frey et al. | |
| 2018/0217851 A1 * | 8/2018 | Sirajuddin | G06F 9/44521 |
| 2018/0357068 A1 * | 12/2018 | Ambichl | G06F 9/545 |
| 2019/0087210 A1 * | 3/2019 | Dowling | G06F 9/45508 |
| 2020/0394119 A1 * | 12/2020 | Williams | G06F 11/3698 |
| 2021/0294726 A1 * | 9/2021 | Reisinger | G06F 9/44521 |
| 2021/0303312 A1 | 9/2021 | Degioanni | |

(Continued)

FOREIGN PATENT DOCUMENTS

CN          107277019 B      5/2020

OTHER PUBLICATIONS

Degioanni, U.S. Appl. No. 17/214,558, filed Mar. 26, 2021, Notice of Allowance and Fees Due, Dec. 22, 2021.

(Continued)

*Primary Examiner* — Lewis A Bullock, Jr.
(74) *Attorney, Agent, or Firm* — Kim & Stewart LLP

(57) ABSTRACT

Techniques for dynamically instrumenting code to capture cleartext from transformed communications are provided. In one technique, an operating system (OS) mechanism receives an OS call. The OS mechanism determines whether the OS call is of a particular type. In response to determining that the OS call is of the particular type, a certain location within executable code of a unction is identified. A user-level collection mechanism is inserted at the certain location. After inserting the user-level collection mechanism, code at the certain location is executed that causes the user-level collection mechanism to be executed.

17 Claims, 14 Drawing Sheets

(56) References Cited

U.S. PATENT DOCUMENTS

2022/0214886 A1    7/2022  Degioanni

OTHER PUBLICATIONS

Degioanni, U.S. Appl. No. 17/214,558, filed Mar. 26, 2021, Non-Final Rejection, Oct. 18, 2021.
International Searching Authority, "Search Report", in "Country" Application No. PCT/US2021/024526, dated Jul. 29, 2021, 13 pages.
Hunt, Galen, et al., "Detours: Binary Interception of WIN32 Functions", published in Proceedings of the 3rd USENIX Windows NT Symp, the Advanced Sys Assoctn Jul. 12, 1999,, pp. 1-10, Jul. 22, 1999, 10pgs.
Hosek, Petr P., et al., "VARAN the Unbelievable", An Efficient N-version Execution Framework, ACM Sigarch Comp. Architecture News, ACM Special Interest Grp on Comp Arch, ASPLOS '15, vol. 43, No. 1, Mar. 14, 2015, 16pgs.
Williams, Paul, "CuPIDS: Increasing Information System Security through the Use of Dedicated Co-processing", Purdue University ProQuest Dissertations Publishin, dated Aug. 2005, 126 pages.
The International Searching Authority, "Search Report" in Application No. PCT/US2022/048254, dated Jan. 27, 2023, 13 pages.

\* cited by examiner

DYNAMIC INSTRUMENTATION TO CAPTURE CLEARTEXT FROM TRANSFORMED COMMUNICATIONS

RELATED APPLICATIONS

This application is related to U.S. patent application Ser. No. 15/959,153 filed on Apr. 20, 2018, now U.S. Pat. No. 10,592,380 issued on Mar. 17, 2020, and U.S. application Ser. No. 15/176,848 filed on Jun. 8, 2016, now U.S. Pat. No. 10,476,767 issued on Nov. 12, 2019, the entire contents of which are incorporated by reference in its entirety as if fully disclosed herein.

TECHNICAL FIELD

The present disclosure relates to instrumenting user code and, more particularly to, dynamically instrumenting user code in order to capture cleartext, at least a copy of which is transformed.

BACKGROUND

Many conventional hardware and software entities (collectively, endpoints) communicate using a variety of network protocols. Some of the protocols are called encrypted protocols and support various kinds of data encryption. Examples of such protocols are Security Socket Layer (SSL) and Transport Layer Security (TLS). More generally, some protocols involve reversible transformations, such as (key-based) encryption, compression, erasure coding, and fountain coding. When endpoints communicate using such protocols with reversible transformations, the data being transported is rendered into a form that makes it unintelligible to any entity that does not have the correct reverse transformation. The data being transmitted is not readily recognizable on the network, but after being received and the transformation is reversed the data is returned to its original form.

With encrypted communication, the term "cleartext" refers to information or data to be communicated between the communicating parties, and the term "ciphertext" refers to the transformed information that is actually sent or transmitted on a communications channel between them. Communication may involve transforming the cleartext into ciphertext, and it can likewise involve recovering the cleartext from the ciphertext by reversing the transformation or undoing the transformation that produced the ciphertext.

Conventional data transformation techniques such as encryption or other transformations of data can pose an impediment to monitoring and troubleshooting in systems that are intended to diagnose, measure, test, analyze, troubleshoot, or debug system operation and performance and that access the data in its transformed state. If analysis of a data processing system is attempted when the data involved in communications between endpoints is in a transformed state, it may be harder for either software, hardware, or a human to know exactly what data was being communicated or otherwise processed in the system being analyzed. If the data were in an untransformed state, identification of what specific processing functionality is occurring at the point of analysis would be easier because the data would be more understandable. It would be helpful to be able to capture as much cleartext as possible with efficiency, security, and flexibility.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
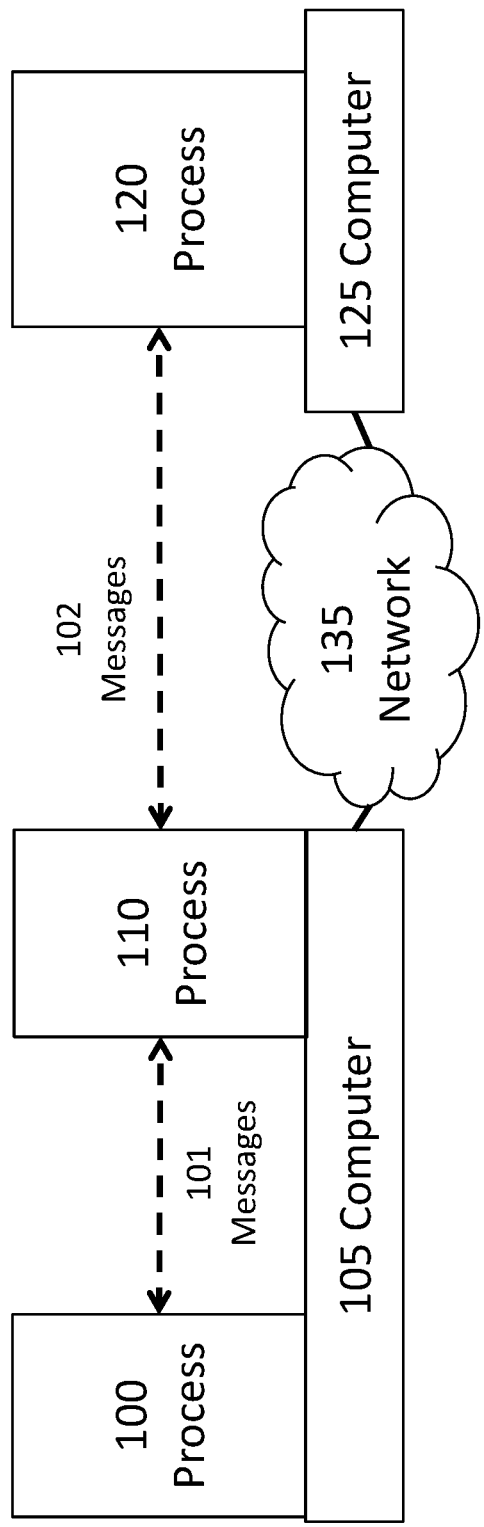
FIG. 1 is a block diagram that depicts three distinct processes, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1.0. General Overview

A system and method are provided for instrumenting a user process (or a process executing in user space) in order to capture cleartext data before the cleartext data is transformed (e.g., encrypted or compressed), rendering the transformed data unrecognizable to downstream processes. The transformation may be in preparation for being stored or transmitted over a computer network to another computing device. In one technique, an instrumenting facility, executing in an operating system (OS), detects a new user process and identifies a location of the executable code of a method or function of interest, such as ssl_read( ) and inserts a user-level collection mechanism around that location. The user-level collection mechanism when executed causes cleartext data to be collected before the cleartext data is transformed and then causes the cleartext data to be transferred to a system-level collection mechanism executing in the operating system. The system-level collection mechanism causes the cleartext data to be stored in a secure storage location for later processing.

Similarly, a user-level collection mechanism may be inserted at a location, in executable code, that is after transformed data is transformed (e.g., decrypted or decompressed) to cleartext data. Thus, the user-level collection mechanism collects the cleartext data and transfers the cleartext data to a system-level collection mechanism.

Embodiments disclosed herein represent improvements to computer-related technology. Embodiments provide a system that can be accomplished automatically as needed, without requiring manual intervention, even in the presence of run-time changes of storage locations of the functions of interest in executable form. The embodiments accommodate computer programs as endpoints of a network communication having different characteristics in terms of memory management at run time. The embodiments further allow inspection of execution state to capture cleartext over different approaches required for acquiring relevant location information related to the functions of interest.

Embodiments have great applicability by targeting common channels through which data is securely transformed, thereby providing significant coverage of cleartext being transformed and transmitted over computer networks. The embodiments provide visibility into the data carried by an encrypted protocol and are workable with little or no configuration, do not require the restart of applications or other crucial software, and do not require the supplying of private keys. Such lightweight nature enables the embodiments to efficiently determine at run time how to capture cleartext and actually capture the cleartext.

Embodiments do not require assessing the trustworthiness of specialized external agents before incorporating them into an endpoint of a network communication. The embodiments comprising the lightweight process can utilize existing methods to inspect the execution state and capture cleartext without any source code alternation to the endpoint.

Such a system is both more attractive to many users, and easier to use in large, complex, and highly automated deployments of hardware and software, such as are found in modern cloud computing systems, such as public or private cloud software and hardware systems.

2.0. Instrumentation

"Instrumentation" generally refers to a technique of measuring a software product's performance by enabling the collection and output of trace information. Instrumentation can involve making changes to a loaded process and one or more handlers that are invoked by those changes that expose operational characteristics. Thus, "instrumenting" refers to the process of making those changes. The terms "instrumentation tool," "instrumentation activity," and "instrumentation facility" refers to a process or system that supports dynamic instrumentation of the running process. Such instrumentation can occur before run time but may need to occur at run time to capture data associated with processes of a dynamic nature.

A fundamental distinction in modern operating systems is between kernel and user. "Kernel" refers to code, data structures, and features that are available to the operating system itself, while "user" refers to code, data structures, and features that are available to the users of the operating system. These terms are sometimes used to refer to spaces or domains, as in "user space" or "kernel domain." Instrumentation activity can occur in the user space or the kernel space. In the context of obtaining cleartext in network communications, instrumentation mainly occurs in the kernel space.

Key-based encryption is a particularly hard example of the general class of encrypted protocols that use reversible transformation, due to the requirement for keys used to encrypt and decrypt data, and the general secure nature of systems that use encrypted data. Reference to an "encrypted protocol" includes simpler cases in which the transformation or reverse transformation does not require a key or actual encryption. Thus, references to encrypted protocols also apply to protocols that apply compression or redundant encoding, or similar "keyless" transformations, or other transformations of data from an original "cleartext" version to a transformed version, and vice versa.

Some analysis of traffic is still possible even with encrypted protocols: simply intercepting and examining the traffic on the network can reveal communication patterns. In conventional systems, it is possible to determine information such as which endpoints are communicating, how much traffic they are exchanging, and when it is happening. However, it is often important to do more detailed analysis, such as understanding when some specific piece of data was transmitted, or matching up requests with corresponding responses. These kinds of analysis depend on visibility of the data being transported, i.e., capturing or recovering cleartext, and are usually impossible with encrypted protocols when attempting to determine what type of exchange is taking place with what particular data, since the data is not able to be easily deciphered or reverse transformed in its encrypted or transformed state.

There are some existing attempts to mitigate this issue. One conventional approach instruments at least one communicating endpoint so as to capture relevant cleartext. This is common in Application Performance Management (APM) products, which involves a specialized agent. Such an agent is installed near at least one endpoint. With appropriate placement, such an agent is able to inspect or intercept the data being transmitted just before it is encrypted, and operates to securely export the untransformed data to support monitoring or troubleshooting systems. Likewise, the agent is able to inspect or intercept data being received just after it has been decrypted. The appropriate placement of the agent can be beneficial compared to alternative approaches, since the agent is likely to be included within whatever security boundary or filtering protects the endpoint itself from attacks and eavesdropping.

However, with conventional APM systems, the agent must be deliberately added into the endpoint of interest and be accepted as secure or trustworthy (e.g. not including malicious code) in a trusted environment. This explicit addition can be inconvenient and may not be workable at scale.

In addition, the agent must have an appropriate placement, with a sufficient level of visibility and privilege to capture the information of interest. Even when it is acceptable to explicitly add in such an agent, the necessary work of identifying and implementing a suitable placement may be difficult or impossible in some cases.

Another conventional approach of capturing ciphertext and reversing the transformation is utilized in various network proxy products, such as firewalls, caches, and wide area networks (WAN) optimization systems. These conventional proxy systems avoid the need to add an agent into an endpoint and instead deal directly with the encrypted traffic that is visible on the network. With a conventional network proxy product, a configuration process grants to the conventional network proxies a status as trusted entity, with access to relevant keys for decrypting the encrypted traffic. Such proxy systems then securely export the data of interest to support monitoring or troubleshooting systems.

As with the conventional APM agents, a problem with conventional network proxy systems is the need to configure them. Such explicit setup is manageable at small scale, but can become problematic in large complex highly-automated deployments of hardware and software, such as are found in modern cloud computing systems.

In contrast to the conventional APM products that have specialized APM agents, it is relatively easy to place conventional network proxy systems. The primary constraint is simply access to the encrypted traffic of interest, which is typically available at many different locations. Conventional network proxy systems come with a corresponding drawback, which is that the network proxy by its nature creates a new location at which the encrypted traffic is unprotected by encryption. The conventional network proxy must not only be trusted with the keys, but it must also withstand potential attacks independently from any endpoint. In contrast, as previously noted, a conventional APM agent typically benefits from operating within whatever security layers protect the endpoint itself.

Another conventional approach for instrumenting at least one endpoint is to build systems with appropriate instrumentation facilities in their encryption layers. One example of such a conventional approach is the combination of kernel implementation of TLS (kTLS) with Berkeley Packet Filter (BPF), as described by authors Daniel Borkmann and John Fastabend in their paper "Combining kTLS and BPF for Introspection and Policy Enforcement," published in the Linux Plumbers Conference '18, November 2018.

In the conventional implementation, kTLS provides an efficient (kernel-based) implementation of the datapath for the encrypted protocol TLS. A conventional BPF program can be optionally attached to the sending of data via TLS, allowing for the efficient inspection of relevant cleartext. This particular conventional kTLS/BPF technique has two notable drawbacks: first, the conventional communicating programs must be aware of—and indeed, the conventional sending program is effectively carrying out—the desired policies. Second, the actual conventional mechanism described in the aforementioned kTLS paper is only applicable for sending data, not for receiving data. This second drawback is due to a specific implementation limitation. However, the first drawback means that this conventional kTLS technique is not relevant for monitoring and troubleshooting arbitrary programs in complex and highly-automated environments.

Another conventional approach for instrumenting an endpoint is to use a system like Istio that is designed to instrument all relevant traffic, but requires applications built with a particular architecture or paradigm. In the case of a conventional system such as Istio, extensive visibility into SSL traffic is possible—but this technique suffers from a deficiency, since it only works if the application to be instrumented has been constructed in a particular style that is compatible with Kubernetes and Istio. For an application that is not already structured in the right form, a conventional system like Istio cannot typically be applied unless the application is first extensively restructured. For some applications such restructuring may not be sensible; for other applications, such restructuring may be too expensive or otherwise undesirable, even if restructuring is possible. Even for an application that could benefit from the restructuring, substantial time and effort are required—and so such restructuring is not a viable option for a currently-running application that needs monitoring or troubleshooting right away.

Two additional conventional techniques include primitive tools that are relevant to monitoring and troubleshooting, but require human intelligence to place well.

Conventional breakpoints are a first example of such a tool requiring human intelligence. A conventional breakpoint technique provides a mechanism that provides for the controlled interruption and examination of a program's state at a designated point in its execution. Such breakpoints are typically implemented by an operating system or a programming language's execution environment. A breakpoint is associated with a particular point in an executable program. When execution reaches the breakpoint, the program's execution is altered from what it would have been without the breakpoint. Typically, execution is transferred to an associated handler. Sometimes the associated handler is very elaborate, invoking an interactive debugger for the program. Sometimes the associated handler is trivial and immediately returns execution to the original program. Often, the handler increments a counter (for example, to count how many times this point in the program has been executed) or gathers some of the program's current state (for example, determining what values are currently on the routine's stack). Whenever the handler finishes, execution of the program resumes immediately after the breakpoint. The conventional UPROBE and URETPROBE mechanisms of the Linux operating system are examples of breakpoints. These example breakpoint mechanisms allow the setting of breakpoints on user processes, but each associated handler runs in the kernel.

A second primitive tool relevant to monitoring and troubleshoot includes a relatively-manual conventional filter language tool, such as such as the above-noted BPF or extended BPF (eBPF). Such conventional filter languages provide a vocabulary for pattern matching and state capture within a kernel, where ordinarily it would be impossible to run a user-supplied program. The filter language is carefully designed to be safe and efficient, which means that the expressive power of the language is limited, but the language is nevertheless a powerful means of collecting information effectively. Such a filter language is especially useful when coupled with breakpoints, since the breakpoint offers an opportunity to examine otherwise-transient state, and the filter language gives a means to safely specify aspects of transient state that are otherwise hard to capture. These approaches are manual approaches that are traditionally used for debugging purposes.

2.0. Network Communication Overview

FIG. 1 is a block diagram that depicts three distinct processes 100, 110, and 120, in an embodiment. In this example, processes 100 and 110 are executing on the same computer 105 while process 120 is executing on a different computer 125. Computers 105 and 125 may be any form of computing hardware, including those embedded in devices not ordinarily considered computers, such as watches, thermostats, or telephones. The processes 100, 110, and 120 can execute directly on a physical computer, on a virtual computer, or within a containerized environment.

Computers 105 and 125 are connected by a network 135, which may comprise multiple networks. Examples of network 135 include local area networks (LANs) and WANs of diverse wired or wireless technology, including combinations of networks, such as the Internet.

Processes 100 and 110 are communicating via messages 101. Processes 110 and 120 are likewise communicating via messages 102. The interactions of processes 110 and 120 may or may not be related to the interactions of processes 100 and 110. The existence of process 120 indicates that embodiments include more than two communicating processes, and that some of the communicating processes of interest may be on different physical machines, possibly far removed geographically from each other.

Messages 101 and 102 may be transmitted according to one or more network protocols that determine the format and meaning of messages. In general, it is straightforward to capture messages 101, 102 and to collect all the messages exchanged between communicating processes. However, it may be difficult to interpret the contents of captured messages. In particular, some network protocols require performance of a nontrivial, but reversible transformation on the data being transmitted, and such transformations may obscure the contents of the message.

Figure 2:
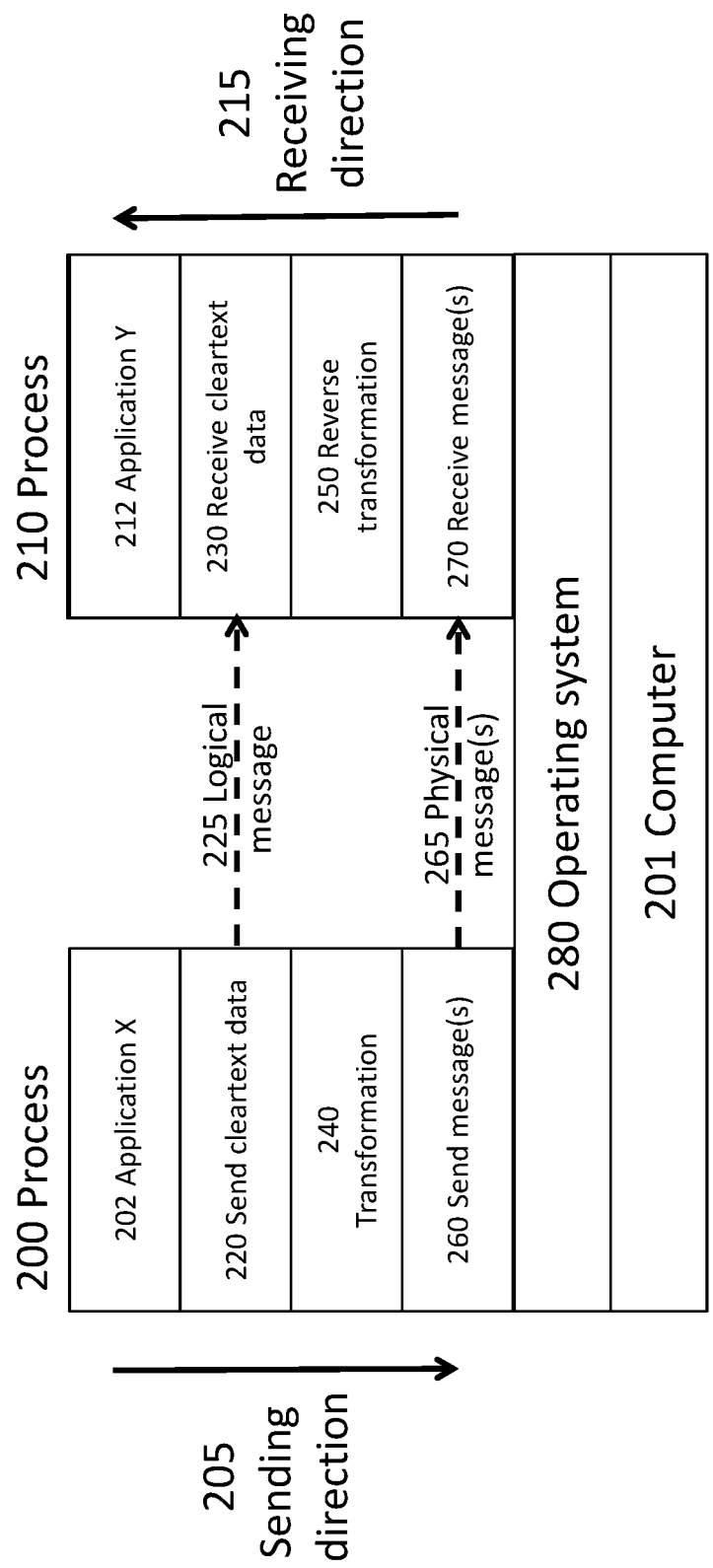
FIG. 2 is a block diagram that depicts communicating processes in more detail relative to FIG. 1, in an embodiment.

FIG. 2 is a block diagram that depicts communicating processes 200 and 210 in more detail relative to FIG. 1, in an embodiment. Specifically, process 200 is a more-detailed version of process 100 depicted in FIG. 1, while process 210 is a more detailed version of process 110 depicted in FIG. 1. Computer 201 is a more detailed version of computer 105 shown in FIG. 1 and includes a depiction of an operating system 280.

Although there is no counterpart in FIG. 2 to process 120 of FIG. 1, techniques applied to communicating processes 100 and 110 may be readily adapted to communicating processes 110 and 120 despite the presence of a communication network, since the protocols of interest are typically designed for use in communication networks.

Application 202 in process 200 sends messages to application 212 in process 210. The communication of the messages leverages a network protocol with a nontrivial but reversible transformation. The techniques applied for sending messages in one direction may also be used for sending messages in the opposite direction, using numerous techniques for efficient and effective communication.

The general flow of data processing activity is shown by the arrows on each side, where arrow 205 shows the progress of the sending activity downward through components of process 200, while arrow 215 shows the progress of the receiving activity upward through components of process 210. Application 202 in process 200 uses a facility 220 to send a logical message 225 that corresponds to cleartext data to application 212 in process 210. Likewise, application 212 in process 210 uses a facility 230 to receive logical message 225 from application 202. Applications 202, 212, in one example configuration, may be cooperating components of a single larger application that is providing a distributed service. However, it is also possible that applications 202, 212 have no prior relationship or knowledge of each other.

Applications 202, 212 operate on cleartext data. However, the actual messages transported across the network are not recognizable as logical message 225. Instead, facility 220 performs (or instructs) a transformation 240 on some or all of the data in logical message 225, and the results are sent by a sending facility 260 as physical message(s) 265 to a receiving facility 270, which receives physical message(s) 265 and performs (or causes/instructs) a reverse transformation 250. Facility 230 accordingly receives the cleartext to be forwarded to application 212, even though logical message 225 was never actually sent between processes 200 and 210.

The protocol including reversible transformation is implemented by elements 220, 240, 260 in process 200 and by elements 270, 250, 230 in process 210. Elements 220, 240, 260 in process 200 and elements 230, 250, 270 in process 210 are counterparts in implementing the protocol, but need not otherwise have similar implementation structure or origin. In one example configuration, these two sets of elements are (or can be) constructed entirely independently. Some or all of these elements in a process may be constructed, by way of example, as a shared library that has been dynamically loaded into the respective process; and some or all of the elements in a process are (or can be) purpose-built as part of the process and not visible or detectable externally.

For troubleshooting and monitoring purposes, it is straightforward to capture all relevant instances of physical message(s) 265, but those instances are not easy to understand given that physical message(s) 265 include data that has undergone a transformation. The overall system is able to transform physical message(s) 265, as needed, to recover logical messages 225. Instead of directly performing this transformation however, in an embodiment, the instrumentation facility extracts relevant transmitted data "above" components 240 and 250. In other words, with the instrumentation facility, the overall system extracts relevant data before the data becomes transmitted data which has been transformed and after received data has been untransformed. One outcome of this embodiment is to capture the cleartext data as it is transmitted by the sender and received by the receiver.

3.0. Network Communication with Collection Mechanisms

Figure 3:
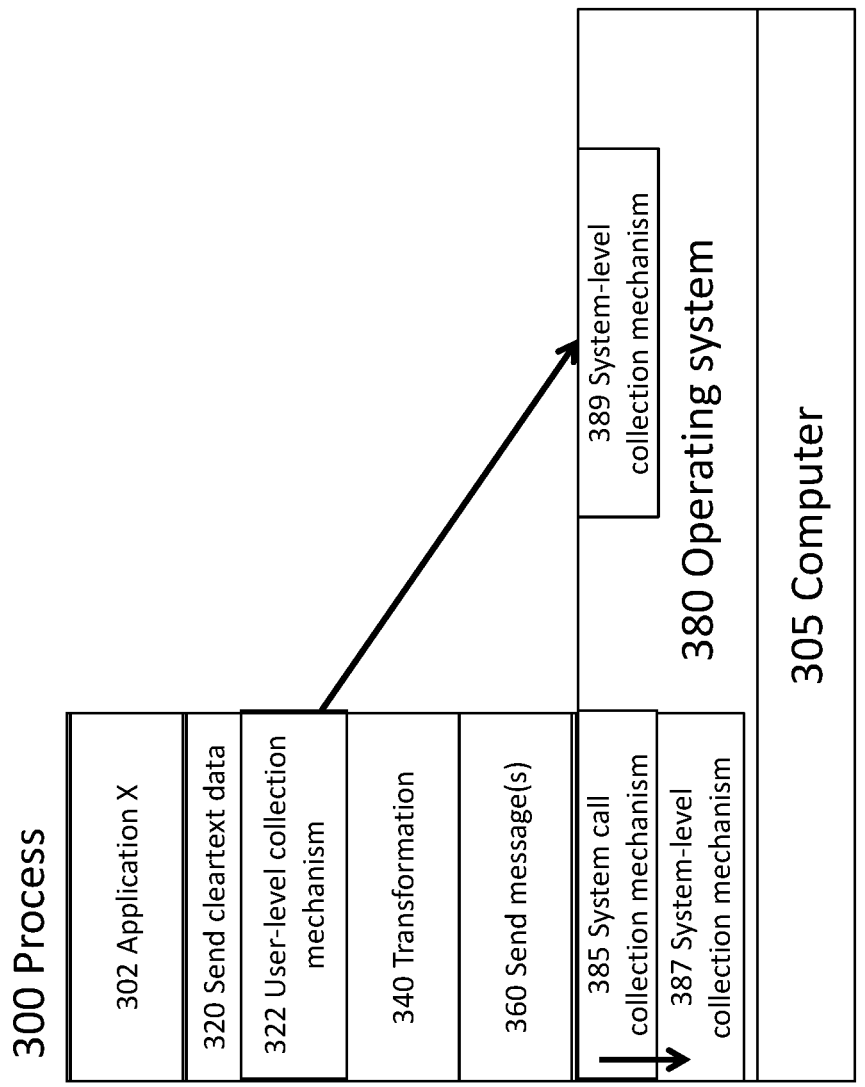
FIG. 3 is a block diagram that depicts a single process along with instrumentation mechanisms for capturing and exporting cleartext data, in an embodiment.

FIG. 3 is a block diagram that depicts a single process 300 along with instrumentation mechanisms for capturing and exporting cleartext data, in an embodiment. Process 300 is a detailed version of process 200 in FIG. 2. Process 300 has been instrumented by an instrumentation facility, following steps that are described in more detail herein. In FIG. 3, elements 322, 385, 387, and 389 are elements relevant to instrumentation and do not have corresponding elements in FIG. 2. On the other hand, elements 300, 302, 305, 320, 340, 360, and 380 correspond respectively to elements 200, 202, 205, 220, 240, 260, and 280 in FIG. 2.

The block diagram of FIG. 3 depicts two different mechanisms for capturing and exporting information. System-call mechanism 385 breaks (or alters execution flow) at system calls, while user-level collection mechanism 322 similarly breaks at addresses in user space. In both example embodiments, there is an associated handler (387, 389) that immediately receives the flow of execution after the break and captures relevant information for export before resuming the program's ordinary flow of processing. Although the block diagram depicts a single user-level collection mechanism 322 and a system-call mechanism 385, multiple such mechanisms, in various combinations, may be useful in instrumenting programs for capturing relevant information.

User-level collection mechanism 322 is triggered when the execution of process 300 reaches a particular address of the user-space program, typically a specific part of the facility for sending or receiving protocol messages. For example, to capture cleartext, the particular address could be for the ssl_write( ) function used by a program to write data to be transformed under SSL to an SSL-enabled socket descriptor or the ssl_read( ) function used by a program to receive data already reverse-transformed under SSL from an SSL-enabled socket descriptor. Other examples of symbols or functions of interest include a compression function, specific examples of which include Gzip library calls to compress and decompress. In one example embodiment, the implementation of the trigger uses a user-level collection mechanism or "breakpoint," such as UPROBE, which can take a function identifier or a specific memory address as an argument. A UPROBE tracepoint can be inserted into object code in a Linux system, for example, by using either the sysfs interface or the perf tool as found in some Linux implementations. For each such user-level collection mechanisms, there is a corresponding system-level collection mechanism 389 (e.g., a handler) that executes in the kernel of operating system 380.

System-call mechanism 385 is triggered when the execution of process 300 makes a particular system call, requesting service from the operating system. An example of setting up instrumentation for system calls that can be used to implement the system call collection mechanism 385 and system-level collection mechanism 387 is disclosed in disclosed in U.S. Pat. No. 10,592,380. Other known mechanisms in which such system-level collection mechanisms (or handlers) are associated with user-level collection mechanisms (or system-call mechanisms, such as system-call mechanism 385) can be utilized.

As further discussed below, the instrumentation could be managed by an agent separate form process 300. The agent would instrument process 300 to set up system call trapping (385) and handling (387). The system-call collection mechanism 385 traps or catches a system call, which can be directly related to capturing cleartext or could start a new process that may invoke user-level calls directly related to capturing cleartext. The system-level collection mechanism 387 instruments a system call directly related to capturing cleartext or, for a system call that starts a new process, sets up user-level call trapping (322) and handling (389).

For each such system call, there is a corresponding system-level collection mechanism 387 (or handler) that executes in the kernel of operating system 380. For both user-level collection mechanism 322 and system-call mechanism 385, the instrumentation of a process involves setting up at least one mechanism that causes execution to go to a corresponding system-level collection mechanism that collects and securely exports message information for monitoring and analysis. FIGS. 5-13 depict elements for such instrumentation in different situations.

Figure 4:
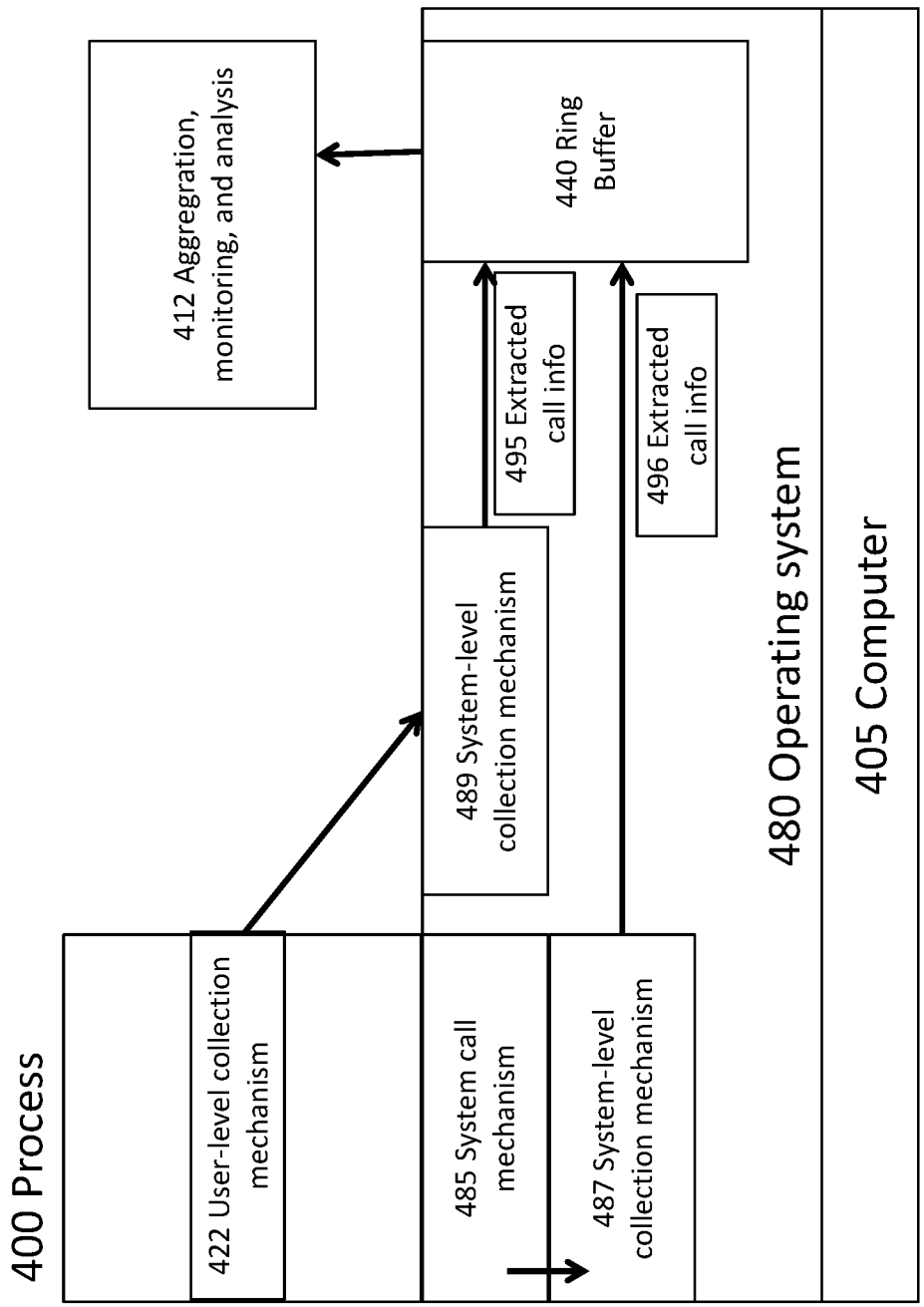
FIG. 4 is a block diagram that depicts how both a user-level collection mechanism and a system-call mechanism transfer extracted information to an external entity, in an embodiment.

FIG. 4 is a block diagram that depicts how both a user-level collection mechanism 422 and a system-call mechanism 485 transfer extracted information to an external entity, in an embodiment. Process 400 is a different view of process 300, narrowed to depict fewer elements within process 400 (relative to process 300) while supplying additional detail to clarify interactions with elements outside process 400. Elements 405, 422, 480, 485, 487, 489 in FIG. 4 are intended to be identical with the respective elements 305, 322, 380, 385, 387, 389 in FIG. 3. Both system-call mechanism 485 and user-level collection mechanism 422 transfer extracted information 495, 496 (respectively) by adding the extracted information to a ring buffer 440. Ring buffer 440 may be a per-CPU ring buffer shared by the kernel space and the user space. One example of using such a ring buffer 440 is disclosed in U.S. Pat. No. 10,592,380. Ring buffer 440 may be tuned to export a very high volume of data from kernel space to user space with minimal overhead. One or more user-space processes 412 carry out aggregation, monitoring, and/or analysis tasks by using the information exported via ring buffer 440.

In an example embodiment, the system call mechanism 485 has an associated system-level collection mechanism 487 (e.g., a handler). When the selected or indicated system call occurs, system call collection 485 causes the transfer of execution to system-level collection mechanism 487. In an embodiment, each handler or system-level collection mechanism is a program that runs in the OS to examine and collect aspects of the user process or operating system state before the user/system call itself runs.

In an embodiment, each system-level collection mechanism (or handler) is an eBPF program. eBPF is a mechanism that is built into Linux kernels and that enables operation of user-created programs in a kernel within a virtual machine. When the system call occurs, the handler is executed by the eBPF virtual machine, extracting relevant information (e.g., information 496) and adding that information to ring buffer 440.

In an embodiment, a user-level collection mechanism 422 has an associated system-level collection mechanism 489 (or handler). When execution reaches user-level collection mechanism 422, user-level collection mechanism 422 causes the transfer of execution to system-level collection mechanism 489.

4.0. Example Process Overview

Figure 5:
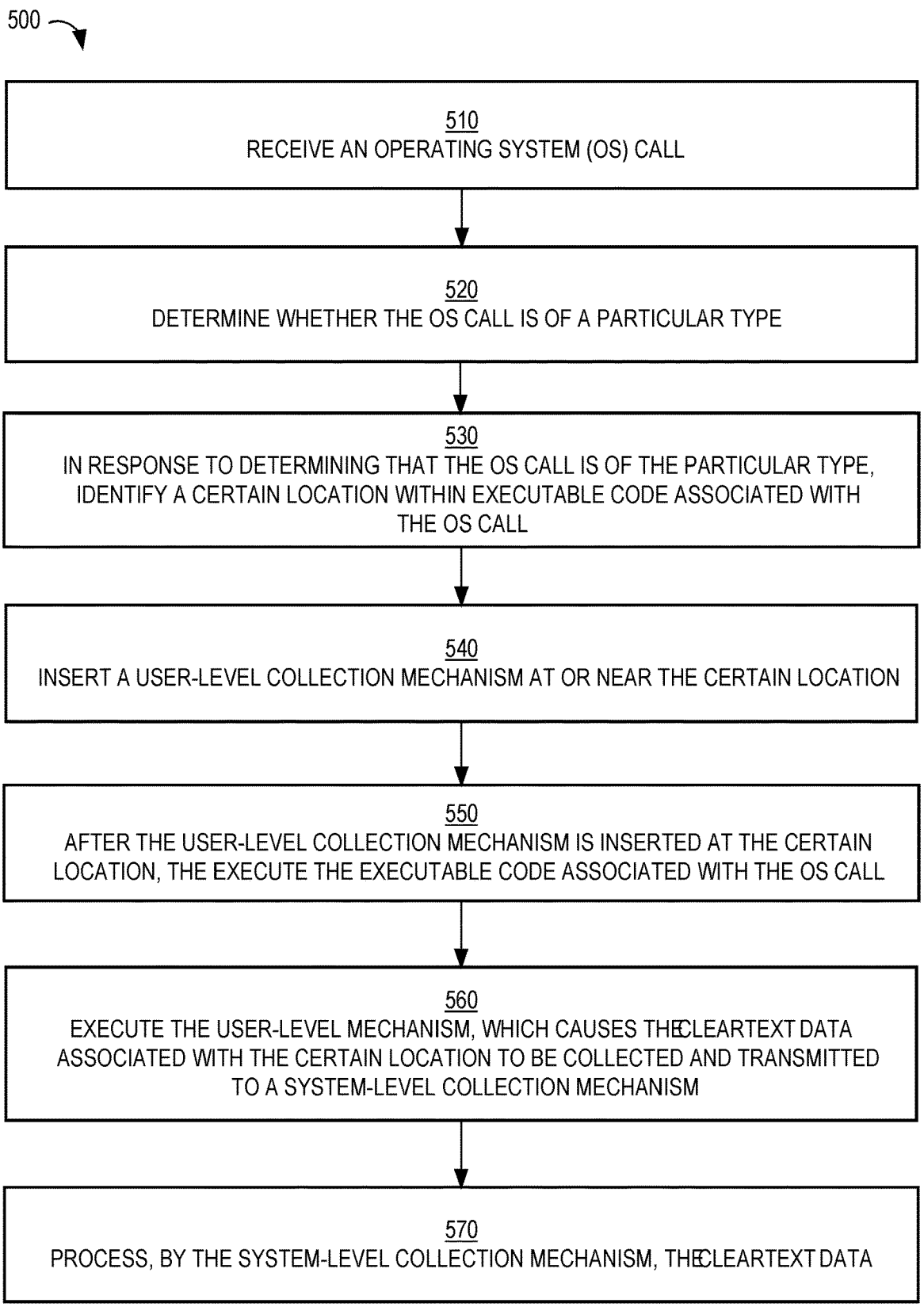
FIG. 5 is a flow diagram that depicts an example process 500 for handling system calls that lead to invocation of user-level calls relevant to capturing cleartext in an embodiment.

FIG. 5 is a flow diagram that depicts an example process 500 for handling system calls that lead to invocation of user-level calls relevant to capturing cleartext in an embodiment. Process 500 includes an example of the handler 487 for invoking a system call illustrated in FIG. 4. Process 500 may be implemented by an instrumentation facility that executes in a kernel of an OS.

At block 510, an OS call is received. The system call may be caught via the system call mechanism 485 illustrated in FIG. 4.

At bock 520, it is determined whether the OS call is of a particular type. For example, the type of OS call may indicate that a new user process is to be executed (in the case of an execve system call), that a new mapping in a virtual address space is to be created (in the case of an mmap system call), or something else entirely.

At block 530, in response to determining that the OS call is of the particular type (e.g., an execve system call or an mmap system call, described in more detail below), a certain location is identified within executable code associated with the OS call. Generally the certain location is for a user-level call to be invoked as a result of invoking the system call. For example, if the particular type indicates that a new user process is to be executed, then the executable code is related to the new user process, and the certain location can be of the executable code of a symbol associated with the new user process. The executable code of the new user process can be used to determine whether the new user process has specific memory management characteristics relevant to instrumentation for capturing cleartext. If the OS call is not one of certain types, then process 500 would end, at least with respect to the received OS call.

Block 530 may involve: (1) identifying a symbol table that is associated with the new user process, where a symbol may represent a user-level call (a function) invoked in the user process, such as ssl_read( ) and the symbol table contains addresses of executable code of such functions; (2) identifying one or more symbols of interest in the symbol table; and (3) for each symbol of interest in the one or more symbols of interest, (i) identifying a particular location that is near the location of the executable code for said symbol of interest.

Block 530 may also involve determining whether each symbol of interest or the corresponding function is to be instrumented upon entry or return. In general, when cleartext data is to be transformed in the corresponding function, the symbol of interest is for entry, and the user-level collection mechanism of a first type (e.g., UPROBE) is considered. When a reverse transformation is to be performed on transformed cleartext data in the corresponding function, the symbol of interest is for return, and the user-level collection mechanism of a second type (e.g., URETPROBE) that is different than the first type is considered.

At block 540, the user-level collection mechanism is inserted at or near the certain location, specifically a location of the executable code of a symbol of interest. For example, if the user-level collection mechanism is of a first type, then the user-level collection mechanism is inserted right before the start of the executable code. If the user-level collection mechanism is of a second type, then the user-level collection mechanism is inserted right after the end of the executable code.

At block 550, after the user-level collection mechanism is inserted, the executable code of the new user process is executed. Executing the executable code involves executing the instrumented executable code of the relevant functions that causes the user-level collection mechanism to be executed.

At block 560, executing the user-level collection mechanism causes cleartext data that is associated with a symbol of interest to be collected and transmitted to a system-level collection mechanism (e.g., a handler) that is executed within the OS.

At block 570, the system-level collection mechanism processes the cleartext data. Block 570 may involve performing one or more aggregation operations and/or sending the cleartext data to a secure ring buffer.

In a related embodiment, in response to determining that the OS call is of the particular type, whether the user process has specific memory management characteristics relevant to instrumentation is determined. The specific memory management characteristics can be related to where executable code of the functions invoked is stored at a given time. One approach of identifying such characteristics is to determine the programming language in which the user process is implemented. Based on the identified programming language, one of multiple techniques to identify the particular location of the executable code of relevant functions is determined. Thus, if the programming language is one particular programming language (e.g., Java), then a first technique is used to identify the certain location and if the programming language is another programming language (e.g., Go), then a second technique that is different than the first technique is used to identify the certain location.

Figure 6:
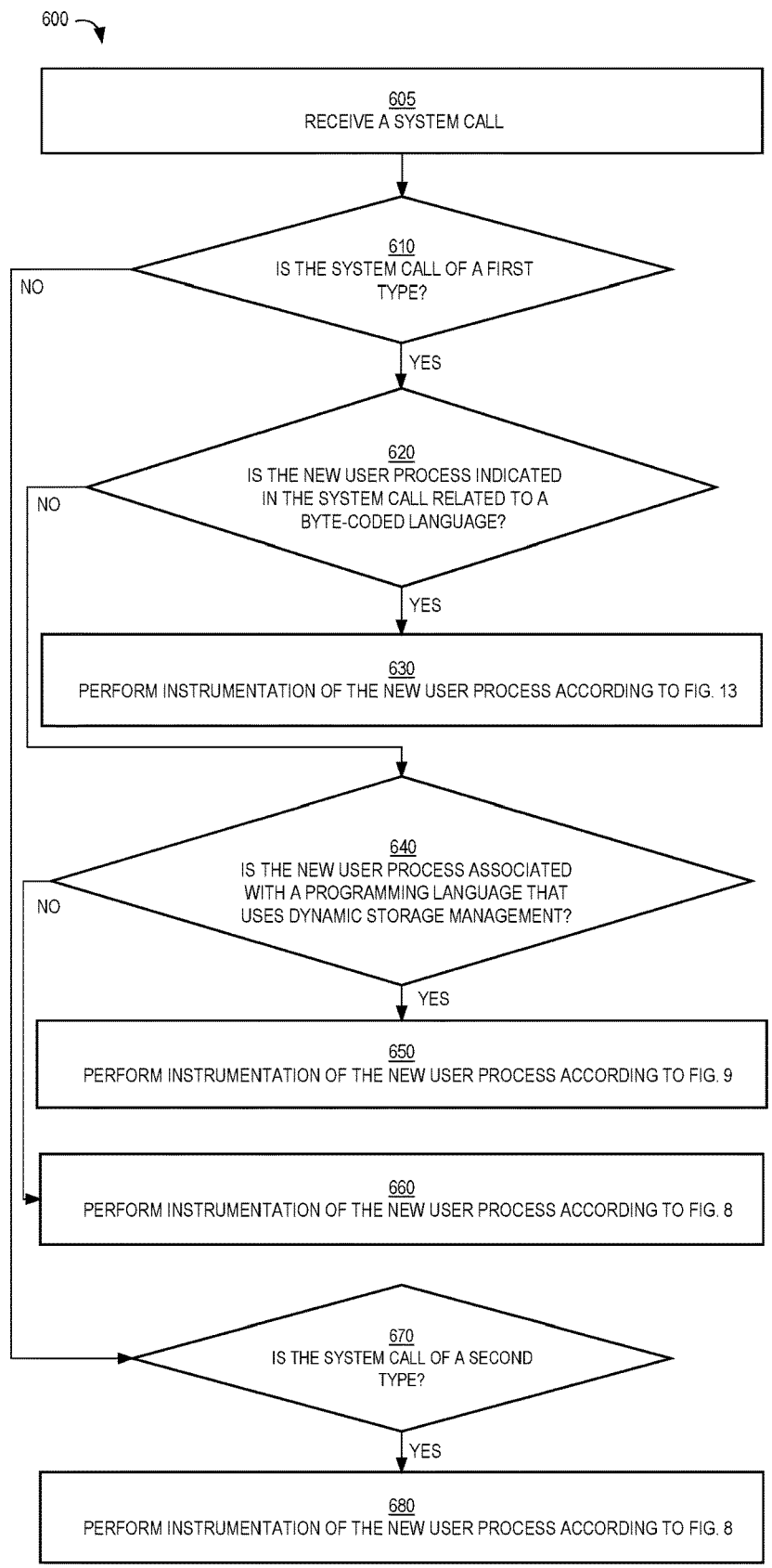
FIG. 6 is a flow diagram that depicts an example process for handling relevant system calls, in an embodiment.

FIG. 6 is a flow diagram that depicts an example process 600 for handling relevant system calls, in an embodiment. Process 600 is similar to process 500, except that process 600 excludes details on how a particular location of the executable code of a symbol of interest is identified (which is described in more detail in the remaining figures) and refers to different ways to instrument a program or library based on the type of system call involved. Process 600 may be performed entirely (or in part) by an instrumentation facility that executes in an operating system (OS) of a computing device.

At block 605, a system call is received.

At block 610, a type of the system call is determined. Such type information is typically provided to a system call handler. A system call may be one of multiple types. Examples of types include (1) a first type that indicates that a new user process is to be executed and (2) a second type that indicates that a new mapping in a virtual address space is to be created. An example of the first type is an execve system call in Linux or an equivalent. An example of the second type is a mmap system call in Linux or an equivalent. If the system call is of the first type, then process 600 proceeds to block 620; otherwise, process 600 proceeds to block 670.

At block 620, it is determined whether the new user process indicated in the system call is related to a byte-coded language with just-in-time compilation, such as Java or another similar language. The presence of bytecode or the invocation of a virtual machine is an indication that the new user process is implemented via dynamic compilation. Just-in-time compilation involves compiling source code at run time. As a result, the storage locations of the executable code of certain symbols are not available before run time. If so, then process 600 proceeds to block 630; otherwise, process 600 proceeds to block 640.

Figure 13:
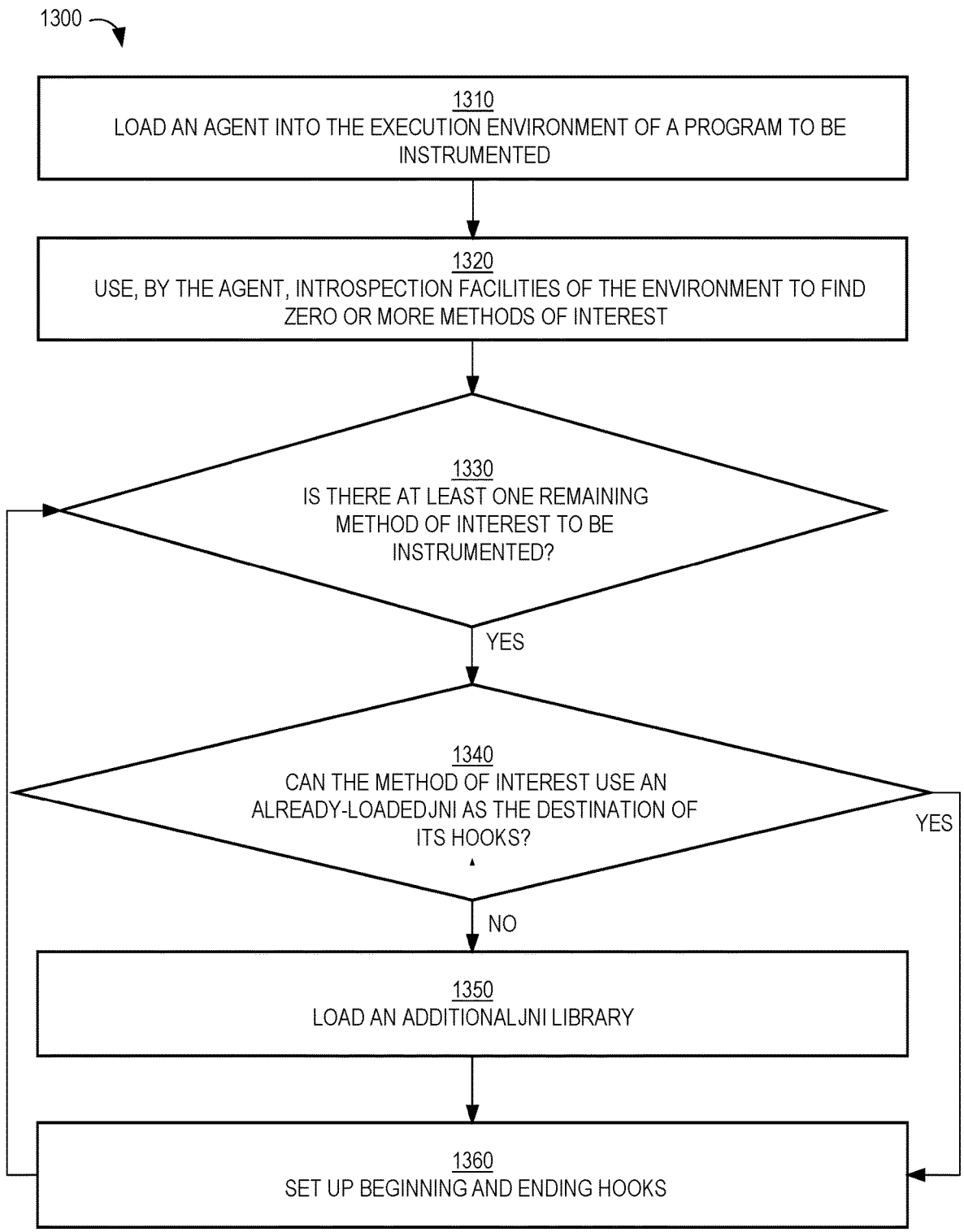
FIG. 13 is a flow diagram that depicts an example process for instrumenting a byte-coded virtual machine, in an embodiment.

At block 630, any potential instrumentation of the new user process is carried out according to the flow diagram of FIG. 13, which is described in detail herein.

At block 640, it is determined whether the new user process indicated in the system call is associated with a programming language that uses dynamic storage management, such as garbage collection. Garbage collection involves moving executable code from one location to another at run time. As a result, the current storage locations of the executable code of certain symbols are to be determined at run time. An example of such a programming language is the Go programming language. If the determination in block 640 is in the affirmative, then process 600 proceeds to block 650; otherwise, process 600 proceeds to block 660.

Figure 8:
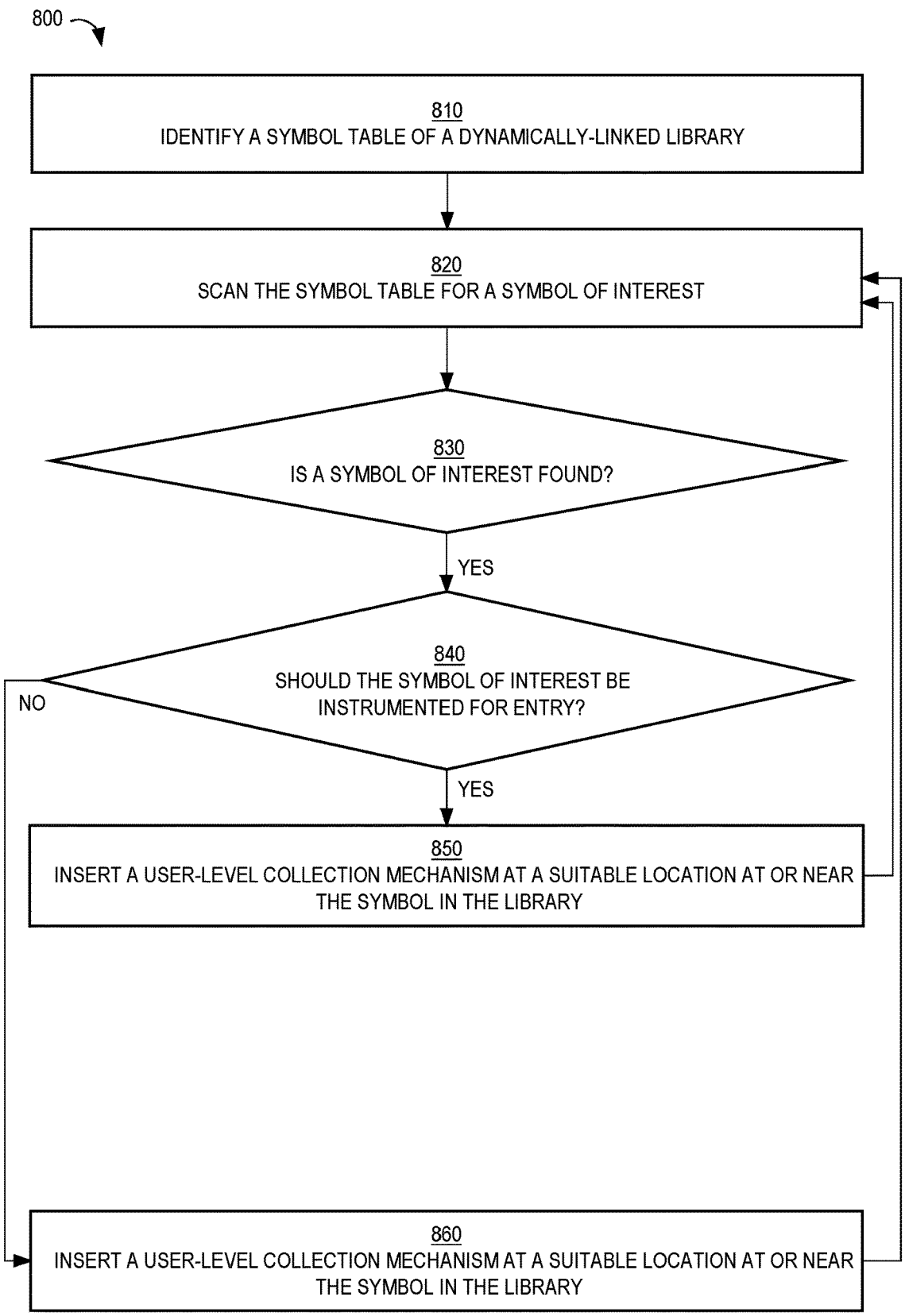
FIG. 8 is a flow diagram that depicts an example process for instrumenting a dynamically-linked library, in an embodiment.

At block 650, any potential instrumentation of the new user process is carried out according to the flow diagram of FIG. 8, which is described in more detail herein.

At block 660, any potential instrumentation of the new user process and its possible statically linked libraries is carried out according to the flow diagram of FIG. 8, which is described in more detail herein.

At block 670, it is determined whether the system call is of the second type, such as an mmap system call or an equivalent system call. An mmap system call essentially takes a file in the file system and maps it to an area in the process address space. A mmap call may thus lead to loading a library in memory so that the library can be used. The process that calls mmap gives the name of a file. A file with that name appears in the process address memory. The library file mapped in memory contains symbols and the relocation offsets of the symbols. The calling process then knows what functions within the library can be called.

In context of embodiments described herein, mmap is used to understand if a library (such as an SSL library) has been loaded. If so, the symbols in the library are resolved so that certain functions (e.g., SSL read and SSL write) are identified. Thereafter, user-level collection mechanisms can then be inserted in the proper location in process memory.

If the system call is of the second type, then process 600 proceeds to block 680 after the dynamic loading or linking is complete; otherwise, process 600 ends. Dynamic loading or linking involves accessing additional executable code at run time. As a result, the storage locations of portions of the additional executable code for additional symbols are to be determined at run time. There may be other processing that occurs with the system call before execution of the system call resumes.

At step 680, any potential instrumentation of the loaded or linked library is carried out according to the flow diagram of FIG. 8.

There are a wide variety of ways in which the classification and separation blocks 610, 620, 640, and 670 can occur, reflecting different choices of sequencing, data representation, and performance.

5.0. Symbol Table

Figure 7:
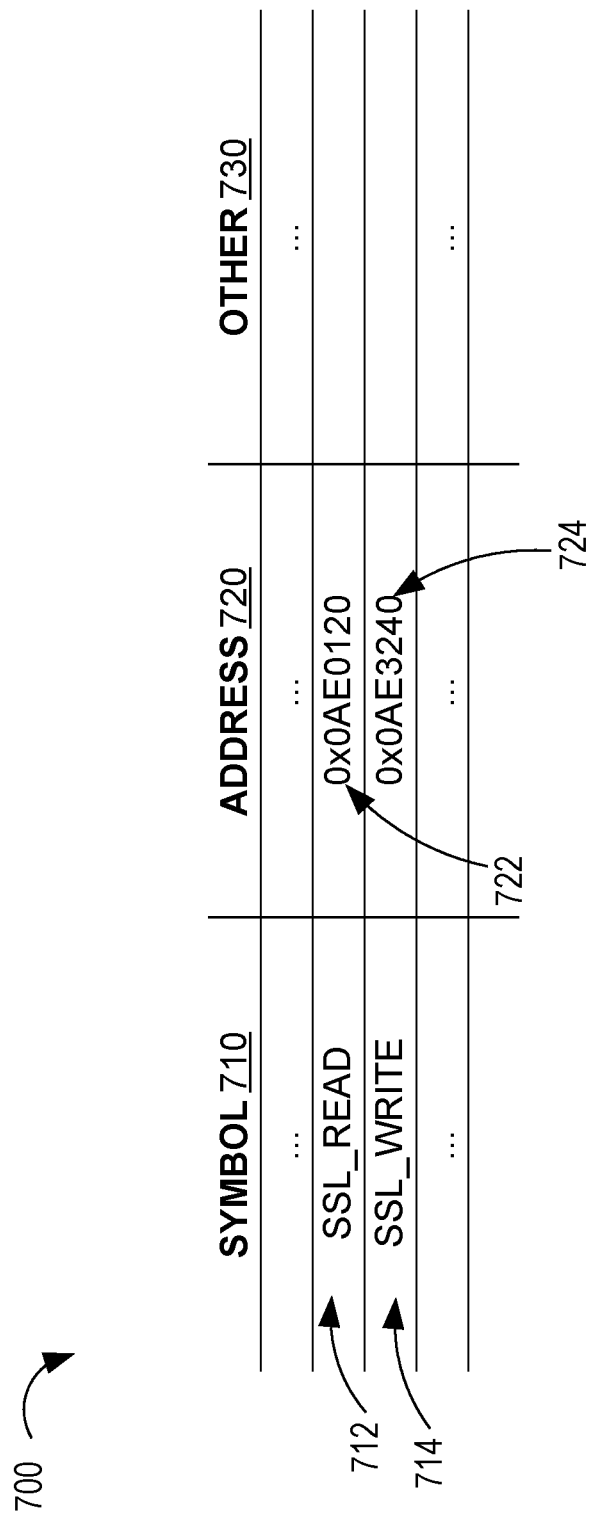
FIG. 7 is a diagram that depicts an example symbol table that is used in conjunction with the process of FIG. 8, in an embodiment.

FIG. 7 is a diagram that depicts an example symbol table 700 that is used in conjunction with the process of FIG. 8, in an embodiment. Typically, each program is associated with a symbol table that stores information regarding the symbols, namely identifiers of variables or functions in the source code of the program. The symbol table is often built during compilation, although information regarding additional symbols can be added at run time for a dynamically loaded library. Execution of the program may also need to access another symbol table for a dynamically linked library. Symbol table 700 includes a column 710 of symbols, a column 720 of addresses that correspond to the symbols, and zero or more columns 730 of other information. Each of symbols 712-714 has a corresponding address (i.e., 722-724) in symbol table 700. There are multiple ways to implement such a table or map in order to find an address of a symbol. Different implementations may vary in their representation and performance and may use a data representation that does not resemble a table with columns, such as, for example, a tree, a hashmap, or other data structure. Different embodiments may vary in terms of (a) finding a symbol corresponding to a given address; (b) efficiently iterating over all symbols in column 710; (c) efficiently iterating over all addresses in column 720; and (d) the exact nature of additional information that may be represented in additional columns 730. There are many other ways to represent names and addresses, in addition to the examples shown in FIG. 7.

Each entry in symbol table 700 represents a symbol that is the name of a procedure to be dynamically instrumented. For each such symbol, the additional information 730 may include an indication of whether the corresponding entry or return of the procedure (e.g., an SSL read or an SSL write) should be instrumented. Instrumenting an entry is typically more relevant for a procedure that is writing data to be sent, while instrumenting a return is typically more relevant for a procedure that is reading data that has been received.

In an embodiment, a system-level collection mechanism (such as 489) includes its own symbol table specifically for the symbols of interest."

6.0. Instrumenting Dynamically-Linked Libraries

FIG. 8 is a flow diagram that depicts an example process 800 for instrumenting a process or linked library, in an embodiment. Process 800 may be performed by the instrumentation facility.

At block 810, a symbol table of a dynamically-linked library is identified. The location of the symbol table is known for any given operating system because the operating system must find and use a library's symbol table to correctly link in the library.

At block 820, the symbol table is scanned for a symbol of interest. A symbol of interest may be limited to a pre-defined list of symbols of interest to which the instrumentation facility has access. This pre-defined list may be hard-coded in the instrumentation facility or may be stored separately therefrom, such as in a configuration file that the instrumentation facility accesses at runtime and that may be updated independently of instrumentation facility.

At block 830, it is determined whether a symbol of interest is found. If none is found, then process 800 ends; otherwise, process 800 proceeds to block 840.

At block 840, it is determined whether the found symbol should be instrumented for entry. This determination may be made in a number of ways, such as based on data from the symbol table (e.g., in another column of the symbol table) or via other means. As an example of other means include the instrumentation facility accessing a first pre-defined list of symbols for entry and a second pre-defined list of symbols for return. If the symbol found in block 830 is found in the first pre-defined list, then block 840 results in the affirmative and process 800 proceeds block 850; otherwise, process 800 proceeds to block 860.

At block 850, a user-level collection mechanism (e.g., a UPROBE) is inserted at a suitable location at or near the symbol in the library. Thus, block 850 involves first identifying a location of the found symbol in the library in order for the user-level collection mechanism to be inserted at the appropriate location in the library. For entry, the user-level collection mechanism is generally to take effect right at entry into the actual function.

Block 850 also involves setting up (or inserting) a system-level collection mechanism (or handler) that corresponds to the user-level collection mechanism. Process 800 returns to If the found symbol of interest is not for entry, then it is for return. For example, block 840 may involve determining that the symbol is found in the second pre-defined list.

At block 860, a user-level collection mechanism (e.g., a RETROBE) is inserted at a suitable location at or near the return from the symbol in the library. For return, the user-level collection mechanism is generally to take effect right at return from the actual function.

Block 860 also involves setting up (or inserting) a system-level collection mechanism (or handler) that corresponds to the user-level collection mechanism of block 860. After the symbol of interest has been examined and instrumenting decisions made, process 800 returns to block 820 where any additional symbols of interest are found in the symbol table.

Although blocks 850 and 860 are similar on the surface, the work involved in block 860 may be more complex because return instrumentation may be more complex than entry instrumentation. In this example, a symbol identifies the corresponding entry address, but the return address may not be known directly from the symbol table. Instead, the return address is captured as part of the procedure calling convention, typically as one of the elements on the stack. Although this difference means that additional work is required to perform block 860 compared to the work required to perform block 850, that additional work is fixed and predictable for a given operating system.

The flow diagram of FIG. 8 may also be followed for instrumenting any process including a static library, in an embodiment. In contrast to dynamic libraries, the main process a statically-linked library might not have a symbol table. However, in current commercial practice, a symbol table is available even though it is not logically required (as it is required for a dynamic library). Thus, FIG. 8 is applicable for the static-library case where the symbol table is available.

7.0. Instrumenting Dynamic Storage Management Programs

Separate from instrumenting static or dynamic libraries, embodiments comprise instrumenting an application that implements the relevant transforming protocols by retrieving address information as needed. Specifically, instead of relying on the addresses contained in the symbol table, the instrumentation obtains address information in real time from another source made. An example of this occurs with executable programs written using a dynamic storage management programming language, such as Go.

Although Go programs (i.e., software programs written in the Go programming language) typically include enough symbol table information to find the routines of interest, the symbol table information is typically not sufficient to perform effective instrumentation of those programs. Go programs also benefit from dynamic storage management (or "garbage collection"). The instrumentation approach outlined in FIG. 8 applies in most cases to static storage management. However, in programs that execute and use dynamic storage management, during program execution, the garbage collector may relocate stack frames and objects to different memory addresses. Although the garbage collector will update all data structures of a Go language program correctly, the garbage collector does not inherently know that the data created by the instrumentation facility is sensitive to relocation. The instrumentation facility may record addresses that need to be corrected when objects move in the program's address space. Accordingly, the garbage collector does not inherently correct any addresses that have been collected as part of the instrumentation of FIG. 8, assuming those structures move to a different address in the Go language programs address space.

Thus, in an embodiment, the instrumentation facility includes an interface to the garbage collector (for languages that supports such an interface). The instrumentation facility informs the garbage collector of address information gathered by the instrumentation facility and the garbage collector then alerts the instrumentation facility of any changes affecting those addresses. However, such an interface does not exist for the specific case of one or more dynamic storage management languages, including the Go language, and in such cases embodiments provide an alternative approach as depicted in FIG. 8 and the accompanying description.

Figure 9:
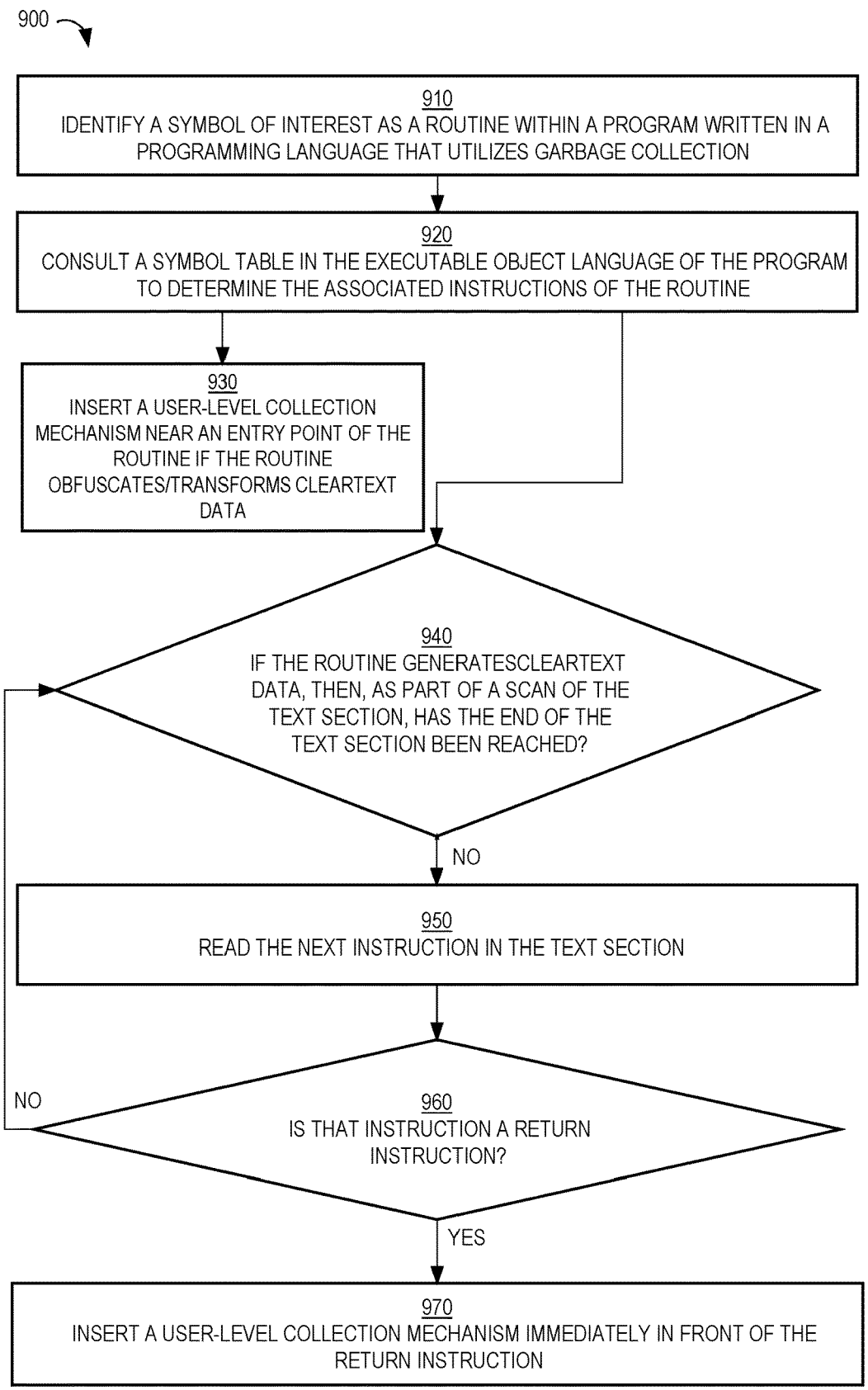
FIG. 9 is a flow diagram that depicts an example process for instrumenting a dynamic storage management program, in an embodiment.

FIG. 9 is a flow diagram that depicts an example process 900 for instrumenting a dynamic storage management program, such as a program written in the Go programming language, in an embodiment. Process 900 is performed by the instrumentation facility.

The Go language, for example, includes a package for accessing Executable and Linkable Format (ELF) objects typically supported by a Unix platform. An ELF executable file is static and contains multiple sections, such as a data section that contains data for a program and a text section, which is the code section of the ELF file. The text section includes the returns of functions in the code. An ELF object for a program consists of zero or more segments and describes how to create a process/memory image for runtime execution. The kernel maps these segments into virtual address space. In other words, the kernel converts predefined instructions into a memory image. Specifically, the ELF object contains a list of symbols of the program (symbol table) that is not affected by garbage collection.

Garbage collection does not operate on assembly code, but rather on dynamic memory that is allocated by a process at runtime. The dynamic memory is the stack of each thread. The dynamic memory is not found in ELF. Garbage collection can change the location of the stack (each thread comprises a stack in Go). Instrumentation for native languages (e.g., C and C++) or static binaries uses RETPROBE, which leverages change in the stack of the thread. With Go, leveraging RETPROBE cannot be done because when garbage collection begins, the stack may be moved and the instrumentation will be corrupted. Rather than rely on the RETPROBE mechanism, embodiments involve dynamic storage management programs (like Go) parsing an ELF object to identify assembly code of a function of interest and identify all points in which the function could return. Then, for each return point, a UPROBE is inserted in the assembly code of the ELF object before the return point.

At block 910, a symbol of interest is identified as a routine within a program written in a programming language that utilizes garbage collection, such as the Go language. The symbol of interest references a routine that is of interest to be instrumented. Examples of the routine include an SSL read routine and an SSL write routine. The symbol of interest can be identified from the ELF executable file, for example.

At block 920, the instructions corresponding to symbol of interest are identified. The portion of the text section corresponding to the symbol of interest can be located, for example. If the routine is a SSL write routine or some other routine that involves transforming or obfuscating cleartext data, then process 900 proceeds to block 930, which involves identifying an entry point for the routine and inserting a user-level collection mechanism (e.g., a UPROBE) immediately after the entry point of the routine in the text section of the ELF file.

Blocks 940-970 describe a process of scanning through the portion of the text section looking for return instructions in the scenario where the routine is a SSL read routine or other routine that involves converting obfuscated/transformed data to cleartext.

At block 940, it is determined whether the scan has reached the end of the portion of the text section for the symbol of interest yet. If not, then process 900 proceeds to block 950 and the next instruction of the text section is read. Otherwise, process 900 ends.

At block 960, it is determined whether that particular instruction is a return. There may be more than one return instruction in a text section and there may be more than one type of return instruction. For example, in the Intel x86-64 architecture, there are at least two types of return instructions of interest, represented by opcodes 0xC2 and 0xC3. If the instruction is not a return instruction, then process 900 returns to block 940 to determine whether that was the last instruction. If the instruction is a return instruction, then process 900 proceeds to block 970.

At block 970, a user-level collection mechanism (e.g., a UPROBE) is inserted immediately in front of the return instruction in the executable code based on the corresponding location information in the portion of the text section. Each such UPROBE has an associated system-level collection mechanism (or handler). Process 900 returns to block 940. Process 900 is repeated for each identified symbol of interest.

Thus, embodiments related to instrumenting programs written in dynamic storage management languages overcome an additional complexity related to conventional breakpoints and information collection. In particular, conventional breakpoint placement and usage is especially complex and fault-prone for Go programs and other programs that similarly use dynamic storage management ("garbage collection.") Embodiments overcome the issue of garbage collection activity relocating stack frames and objects to other addresses within the address space, which would normally result in information collected at an earlier breakpoint becoming invalid.

8.0. Instrumenting a Dynamic Compilation Program

As an example of dynamic compilation, a Java compiler generates intermediate bytecodes that is translated into machine code via just-in-time compilation at run time to be executed by a virtual machine. When a received system call involves starting a Java program, what is available at the time of receipt is bytecode instead of machine executable code of the Java program. Therefore, a dynamic tracing mechanism that works with executable code does not readily work with that Java program. However, the bytecode can be instrumented via hooks. Generally speaking, a hook is a method of interposing a first piece of code right in front of or subsequent to a second piece of code, so that the first piece of code executes before or after the second piece of code, giving the first piece of code an opportunity to monitor and/or filter the behavior of the second piece of code.

In some embodiments, a certain function that is not implemented by a language supporting dynamic compilation and thus can be readily instrumented is pre-instrumented. For example, UPROBE can be applied to such a function to trap all invocations of the function not tied to specific user processes. Then one or more hooks are added around the bytecode of a Java method directly related to capturing cleartext using known techniques, such as the ASM library. The hook includes a call to a native function through a native interface, such as JNI. The native function would be the pre-instrumented certain function noted above. Therefore, at run time, when machine executable code for the Java method and the hooks is executed, given the location of the hooks, each hook may have and transfer state information of the Java method to the pre-instrumented function, which can then be collected by the UPROBE handler.

Figure 10:
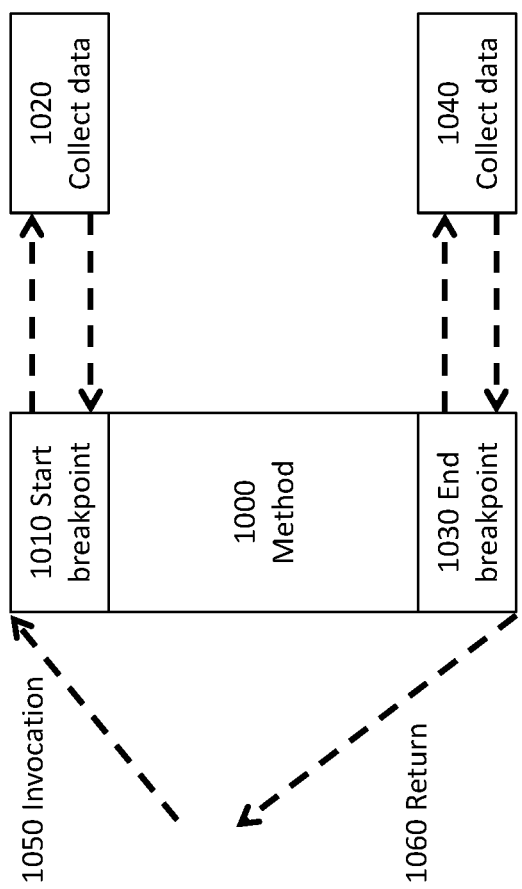
FIG. 10 is a block diagram that depicts a model for instrumenting methods of a Java program, in an embodiment.
Figure 11:
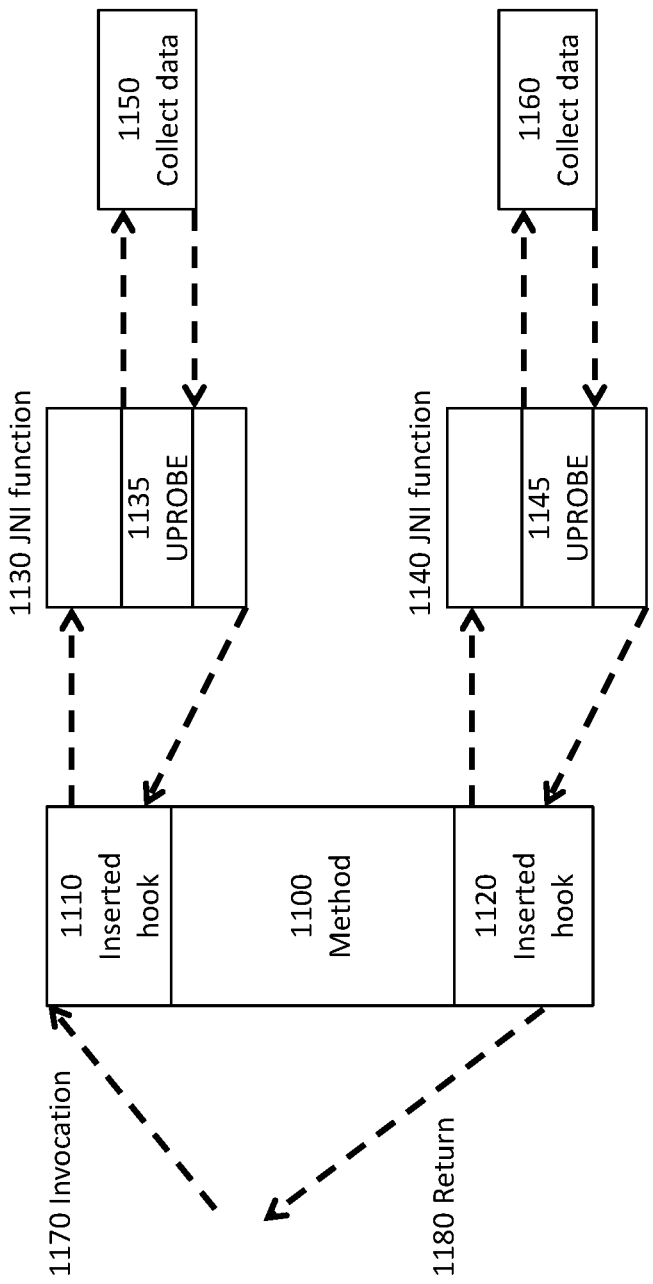
FIG. 11 is a block diagram that depicts a more detailed version of how a Java program is instrumented, in an embodiment.
Figure 12:
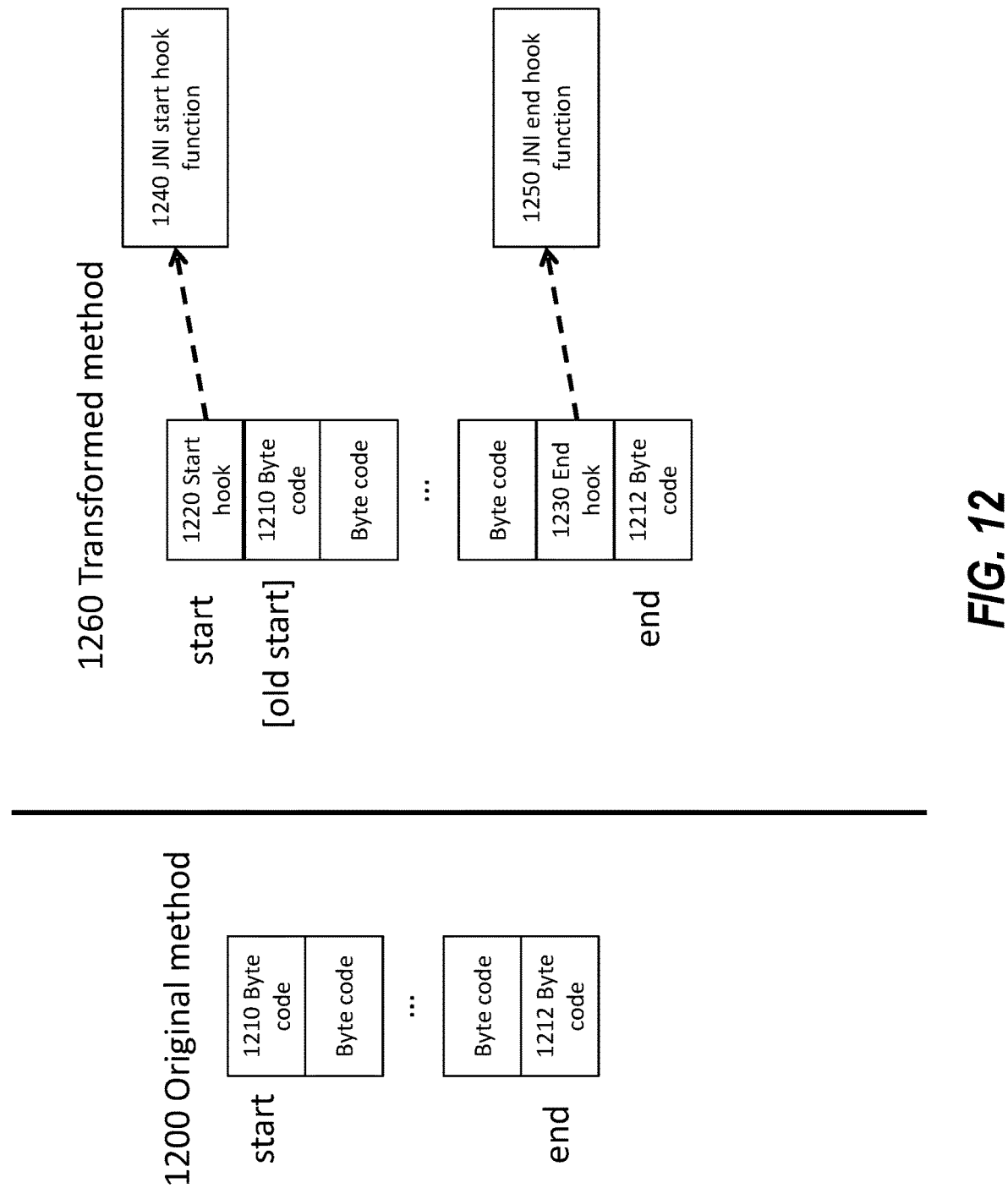
FIG. 12 is a block diagram that depicts a more detailed version of how a Java method is transformed to add the necessary user-level collection mechanism, in an embodiment.

FIG. 10 is a block diagram that depicts a model for instrumenting methods of a Java program, in an embodiment. FIG. 10 depicts a logical view of the model while FIGS. 11 and 12 depict details of an implementation. Method 1000 represents a unit of invocation in a Java program. An example of method 1000 is a write method that, when invoked, writes transformed data to an SSL socket. To underscore this aspect, invocation 1050 of method 1000 and return 1060 from method 1000 are shown on the left. At the beginning of method 1000 is at least one start-breakpoint 1010 that transfers execution to a data collecting program 1020. Similarly, at the end of method 1000 is an end-breakpoint 1030 that transfers execution to a data collecting program 1040. Data-collecting programs 1020 and 1040 may be the same program, different programs, or some combination, such as different initial actions combined with a shared collection facility. There are other sensible and useful combinations. A Java Virtual Machine (JVM) has a breakpoint facility as part of its implementation, but that facility must be invoked at the start of the JVM's execution. In contrast, an instrumentation facility sets user-level collection mechanisms (e.g., breakpoints) and collects data on running production JVMs that do not require a restart.

FIG. 11 is a block diagram that depicts a more detailed version of how a Java program is instrumented, in an embodiment. Method 1100 corresponds to method 1000. The initial breakpoint is implemented by inserted hook 1110. An implementation of inserted hook 1110 is explained in FIG. 12 and the accompanying description. Correspondingly, the ending breakpoint is implemented by inserted hook 1120, which is likewise explained in FIG. 12 and the accompanying description. Two elements in FIGS. 11 (1130 and 1140) are Java Native Interface (JNI) routines. JNI is an interface that allows Java methods to invoke non-Java programs, such as a native C library. Although JNI is a mechanism specific to Java, similar "callout" interfaces exist in other languages and programming environments to provide similar capabilities. Embodiments are applicable to all such programming environments.

Inserted hook 1110 is triggered when it is executed at the beginning of method 1100 and operates by invoking JNI function 1130, which is an empty function. In this example, JNI function 1130 itself has previously been instrumented, such as by UPROBE 1135 (a type of user-level collection mechanism) and associated breakpoint handler 1150. On encountering UPROBE 1135, execution transfers to breakpoint handler 1150 (a system-level collection mechanism) which collects data about the state of the JNI function 1130 that may cleartext data processed in the method 1100. In this example, some of the state in JNI function 1130 may have been collected from method 1100 and transferred by inserted hook 1110.

Similarly, inserted hook 1120 is triggered when it is executed just before the end of method 1100 and operates by invoking JNI function 1140, which is also an empty function and is only used on which to place a user-level collection mechanism. JNI function 1140 has previously been instrumented, such as by UPROBE 1145 (a type of user-level collection mechanism) and associated breakpoint handler 1160. On encountering UPROBE 1145, execution transfers to breakpoint handler 1160 which collects data about the state of the JNI function 1140. Likewise, in this example, some of the state in JNI function 1140 may have been collected from method 1100 and transferred by inserted hook 1120.

FIG. 12 is a block diagram that depicts a more detailed version of how a Java method is transformed to add the necessary user-level collection mechanism, in an embodiment. On the left is original method 1200, which is a sequence of byte codes (for the JVM) that includes a start byte code 1210 and an end byte code 1212. Method 1200 is depicted with a label "start" showing the first byte code, and a label "end" showing the last byte code in the method. On the right is "transformed" method 1260, which is still a sequence of byte codes. However, the start of method 1260 consists of start hook 1220, which consists of at least one byte code prepended to the first byte code of the original method, i.e., method 1200.

Start hook 1220 has at least the effect of invoking JNI start hook function 1240. Start hook 1220 may also gather information and transfer it to JNI start hook function 1240. The end of transformed method 1250 is still the same byte code as the last byte code of original method 1200, but in (transformed) method 1260, end hook 1230 has been prepended to the last byte code. End hook 1230 consists of at least one byte code and has at least the effect of invoking JNI end hook function 1250. End hook 1230 may also gather information and transfer it to JNI end hook function 1250.

The JNI function invocations in FIG. 12 may (or may not) match the JNI function invocations in FIG. 11. Accordingly, in one embodiment it is possible to combine FIGS. 11 and 12 to produce a particular implementation of the functionality described in FIG. 10; however, in another embodiment, these mechanisms are used separately or in combination with other mechanisms. FIG. 12 may be viewed as a detailed view of the left portion of FIG. 11

FIG. 13 is a flow diagram that depicts an example process 1300 for instrumenting a program executed on a byte-coded virtual machine, in an embodiment. Process 1300 is implemented by an instrumentation facility. Process 13 is effective even for byte-coded virtual machines with just-in-time compilation (such as Java), even though those characteristics may make instrumentation difficult. The technique of the specific embodiment applied depends on introspection and a native-code interface (e.g., JNI), which are also supported in a byte-coded virtual machine, such as Java.

At block 1310, an agent is loaded into the execution environment of the program to be instrumented. For example, using the Java programming language and environment, the agent is executing on the same Java Virtual Machine (JVM) as the program to be instrumented. The agent sends a signal to the JVM requesting that the JVM load the agent into the execution environment of the program.

In one version of the Java programming environment, block 1310 involves the invocation of "VirtualMachine.attach( . . . )" to identify the JVM of interest, followed by the invocation of the "loadAgent( . . . )" method on the Virtual-Machine object representing the JVM of interest. These mechanisms can be complex, especially when the JVM of interest is executing in a container. An example of a system in which embodiments of the invention may be applied when programs are operating in containers is disclosed in U.S. Pat. No. 10,476,767.

At the end of block 1310, the agent is no longer isolated from the program of interest; instead, the agent is effectively executing within the same environment as the program of interest.

At block 1320, the agent uses introspection facilities of the environment to find methods of interest. The program to be instrumented consists of byte-code instructions and does not have a conventional symbol table. However, the execution environment does have a mechanism for introspection, in which a program can be queried about its own properties. In an implementation that uses the Java programming language and environment, the agent uses the Java mechanisms for reflection. For example, to find the method named "read" in a class called "SSL," the program could make reference to "SSL.class.getMethod ("read")". In this reference, SSL names a class of interest in the environment, and the construction "class.getMethod" allows access to a particular method of the class by its textual name, effectively implementing a similar text-name-to-address lookup that can happen with a symbol table.

Blocks 1330 through 1360 outline a repeating process of dealing with each additional method of interest.

At block 1330, it is determined (e.g., by the instrumenting agent) whether there is at least one remaining method of interest to be instrumented. If not, process 1300 ends. Otherwise, there is a remaining method of interest and, therefore, there are additional steps to perform to set up that method's hooks and associated JNI routines. The interaction between hook and JNI is outlined in FIGS. 10-12 and the accompanying description.

At block 1340, it is determined whether the method of interest can use an already-loaded JNI as the destination of its hooks. If the byte-code has already been instrumented with a JNI function, then the byte-code does not need to be changed again with another JNI function. In such a scenario, the Java method already has the necessary hooks and a user-level collection mechanism just needs to be inserted in the JNI function. If not, then proceeds 1300 proceeds to block 1350, where a JNI function is loaded for a new pre-instrumented native function.

Whether the relevant JNI is newly-loaded or was already loaded in a previous block, in block 1360, beginning and ending hooks are set up or established. Setting up a hook involves inserting executable code of a hook into a location of other executable code. The method of interest is, therefore, transformed as outlined in FIG. 12. The overall approach to this embodiment's instrumentation approach was outlined above in FIGS. 10-12, as well as the associated descriptions. After setting up the relevant hooks in block 1360, process 1300 returns to block 1330 to determine if there are additional methods to be instrumented.

Based on the foregoing, embodiments overcome complexity related to the structure of certain programming environments, such as Java. In a conventional system like Java, naming information that is relevant to breakpoint placement is not present in symbol tables, but instead must be extracted via run-time introspection facilities. In addition, conventional Java is a byte-code system with just-in-time compilation and garbage collection. These aspects mean that in addition to the aforementioned difficulties encountered with the Go garbage collector, there are additional complexities with conventional automated breakpoint placement, because the programs being instrumented may change their form dynamically from byte codes to compiled code.

9.0. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 14:
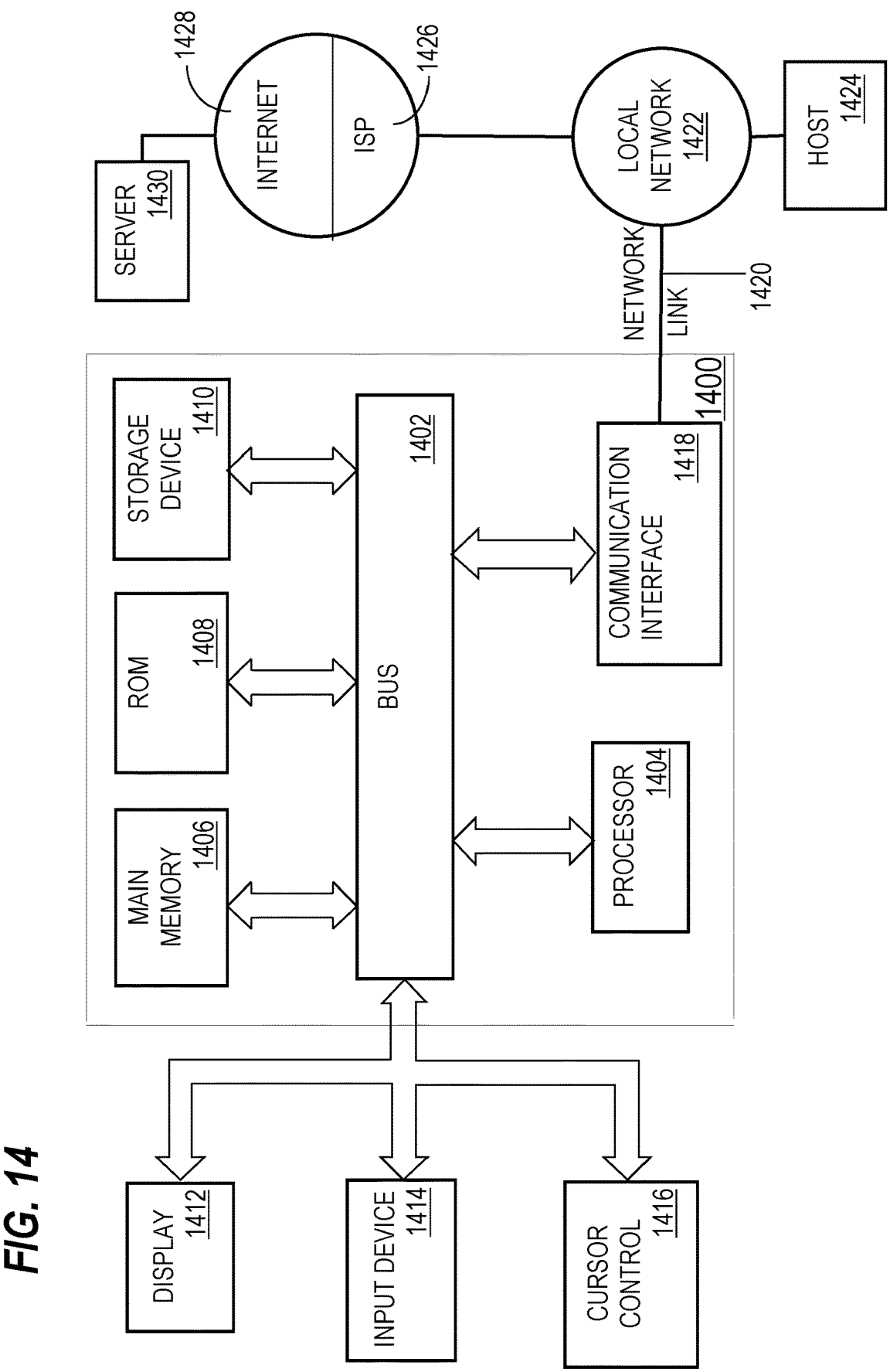
FIG. 14 is a block diagram that illustrates a computer system upon which an embodiment of the invention may be implemented.

For example, FIG. 14 is a block diagram that illustrates a computer system 1400 upon which an embodiment of the invention may be implemented. Computer system 1400 includes a bus 1402 or other communication mechanism for communicating information, and a hardware processor 1404 coupled with bus 1402 for processing information. Hardware processor 1404 may be, for example, a general purpose microprocessor.

Computer system 1400 also includes a main memory 1406, such as a random access memory (RAM) or other dynamic storage device, coupled to bus 1402 for storing information and instructions to be executed by processor 1404. Main memory 1406 also may be used for storing temporary variables or other intermediate information during execution of instructions to be executed by processor 1404. Such instructions, when stored in non-transitory storage media accessible to processor 1404, render computer system 1400 into a special-purpose machine that is customized to perform the operations specified in the instructions.

Computer system 1400 further includes a read only memory (ROM) 1408 or other static storage device coupled to bus 1402 for storing static information and instructions for processor 1404. A storage device 1410, such as a magnetic disk, optical disk, or solid-state drive is provided and coupled to bus 1402 for storing information and instructions.

Computer system 1400 may be coupled via bus 1402 to a display 1412, such as a cathode ray tube (CRT), for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane.

Computer system 1400 may implement the techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor 1404 executing one or more sequences of one or more instructions contained in main memory 1406. Such instructions may be read into main memory 1406 from another storage medium, such as storage device 1410. Execution of the sequences of instructions contained in main memory 1406 causes processor 1404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1410. Volatile media includes dynamic memory, such as main memory 1406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1402. Transmission media can also take the form of acoustic or light waves, such as those generated during radio-wave and infra-red data communications.

Various forms of media may be involved in carrying one or more sequences of one or more instructions to processor 1404 for execution. For example, the instructions may initially be carried on a magnetic disk or solid-state drive of a remote computer. The remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on bus 1402. Bus 1402 carries the data to main memory 1406, from which processor 1404 retrieves and executes the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card, cable modem, satellite modem, or a modem to provide a data communication connection to a corresponding type of telephone line. As another example, communication interface 1418 may be a local area network (LAN) card to provide a data communication connection to a compatible LAN. Wireless links may also be implemented. In any such implementation, communication interface 1418 sends and receives electrical, electromagnetic or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the world wide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are example forms of transmission media.

Computer system 1400 can send messages and receive data, including program code, through the network(s), network link 1420 and communication interface 1418. In the Internet example, a server 1430 might transmit a requested code for an application program through Internet 1428, ISP 1426, local network 1422 and communication interface 1418.

The received code may be executed by processor 1404 as it is received, and/or stored in storage device 1410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
receiving, by an operating system (OS) mechanism within an OS, an OS call;
determining, by the OS mechanism, whether the OS call is of a particular type, the particular type indicating that a new user process is to be executed or that a new mapping in a virtual address space is to be created;
in response to determining that the OS call is of the particular type, identifying a certain location within executable code of a user-level call associated with the OS call, the certain location being a location for the user-level call to be invoked as a result of invoking the OS call, the user-level call involving transforming cleartext data to ciphertext data and transmitting the ciphertext data over a computer network without the cleartext data being transmitted;
inserting a user-level collection mechanism at the certain location within the executable code of the user-level call;
after inserting the user-level collection mechanism, executing code at the certain location that causes the user-level collection mechanism to be executed, along with transform of the clear text data to the ciphertext data and transmission of the ciphertext data over the computer network,
wherein executing the user-level collection mechanism causes the cleartext data, which is associated with the certain location, to be collected and transmitted to a system-level collection mechanism that is associated with the inserted user-level collection mechanism and executed within a kernel space of the OS; and
exporting the cleartext data from the kernel space of the OS to a user space, and monitoring or analyzing the exported cleartext data in the user space for system analysis,
wherein the method is performed by one or more computing devices.

2. The method of claim 1, further comprising:
in response to determining that the OS call is of the particular type, identifying a memory management property that is associated with a user process related to the OS call; and
based on the memory management property, determining one of a plurality of techniques to identify the certain location within the executable code.

3. The method of claim 2, wherein the memory management property is based on dynamic compilation with a virtual machine, and one of the plurality of techniques comprises:
identifying one or more methods of interest from bytecodes of the user process; and
for each method of interest of the one or more methods of interest, inserting one or more hooks into the bytecode before or after the method, each hook of the one or more hooks being configured to invoke an instrumented native user-level function as a call-out.

4. The method of claim 2, wherein the memory management property is based on dynamic compilation with a virtual machine, wherein the one of the plurality of techniques comprises:

loading an agent into a programming environment of the user process and executing the agent in the programming environment, the agent being configured to identify one or more methods of interest from the user process;
for each method of interest of the one or more methods of interest:
determining a Java Native Interface (JNI) routine; and
inserting, into the user process at the certain location, a hook that is associated with the JNI routine.

5. The method of claim 4, wherein determining the JNI routine comprises:
determining whether to use an already-loaded JNI routine; and
in response to determining to not use an already-loaded JNI routine, loading a new JNI routine, wherein the JNI routine is the new JNI routine.

6. The method of claim 4, wherein the JNI routine is a first JNI routine, the hook is a first hook, and the certain location is a first location, the method further comprising:
determining a second JNI routine; and
inserting, into the user process at a second location that is different than the first location, an end hook that is associated with the second JNI routine.

7. The method of claim 2, wherein the memory management property is based on dynamic storage management, wherein the one of the plurality of techniques comprises:
identifying a particular symbol associated with the user process, wherein the particular symbol references a routine;
determining a plurality of instructions and associated storage locations from an Executable and Linkable Format (ELF) executable file; and
for each instruction of the plurality of instructions:
determining whether said each instruction is a return instruction; and
inserting a collection mechanism before said each instruction if said each instruction is a return instruction based on the associate storage location from the ELF executable.

8. The method of claim 2, wherein the memory management property is based on dynamic storage management, and one of the plurality of techniques comprises:
identifying a memory-mapping area for a user process associated with the system call that is accessed by a garbage collector to provide a current location of executable code of each symbol of the user process and includes a list of instructions in the executable code;
scanning the memory-mapping area for an instruction of a specific type in the list of instructions for a symbol of interest and an associated address; and
inserting a collection mechanism before an address of specific instruction.

9. The method of claim 1, further comprising:
identifying a symbol table associated with the user process;
identifying one or more symbols of interest in the symbol table and one or more addresses of executable code associated with the one or more symbols of interest; and
for each symbol of interest in the one or more symbols of interest:
identifying a particular location that is near a corresponding address associated with the symbol of interest;
inserting a particular user-level collection mechanism at the particular location; and establishing a particular system-level collection mechanism in the OS.

10. The method of claim 9, further comprising:
determining whether said each symbol of interest is for return or for entry;
wherein the one or more symbols of interest are a plurality of symbols of interest that includes a first symbol of interest and a second symbol of interest that is different than the first symbol of interest;
determining that the first symbol of interest is for entry and that the second symbol of interest is for return;
based on the first symbol of interest being for entry, inserting, at a first location that is near a corresponding first address associate with the first symbol of interest, a user-level collection mechanism of a first type; and
based on the second symbol of interest being for return, inserting, at a second location that is near a corresponding second address associated with the second symbol of interest, a user-level collection mechanism of a second type that is different than the first type.

11. The method of claim 1, the user-level call is ssl_read, ssl_write, or another method related to transmitting secure content over a computer network.

12. One or more non-transitory storage media storing instructions which, when executed by one or more processors, cause:
receiving, by an operating system (OS) mechanism within an OS, an OS call;
determining, by the OS mechanism, whether the OS call is of a particular type, the particular type indicating that a new user process is to be executed or that a new mapping in a virtual address space is to be created;
in response to determining that the OS call is of the particular type, identifying a certain location within executable code of a user-level call associated with the OS call, the certain location being a location for the user-level call to be invoked as a result of invoking the OS call, the user-level call involving transforming cleartext data to ciphertext data and transmitting the ciphertext data over a computer network without the cleartext data being transmitted;
inserting a user-level collection mechanism at the certain location within the executable code of the user-level call;
after inserting the user-level collection mechanism, executing code at the certain location that causes the user-level collection mechanism to be executed, along with transform of the clear text data to the ciphertext data and transmission of the ciphertext data over the computer network,
wherein executing the user-level collection mechanism causes the cleartext data, which is associated with the certain location, to be collected and transmitted to a system-level collection mechanism that is associated with the inserted user-level collection mechanism and executed within a kernel space of the OS; and
exporting the cleartext data from the kernel space of the OS to a user space, and monitoring or analyzing the exported cleartext data in the user space for system analysis.

13. The one or more storage media of claim 12, wherein the instructions, when executed by one or more processors, further cause:
in response to determining that the OS call is of the particular type, identifying a memory management property that is associated with a user process related to the OS call; and
based on the memory management property, determining one of a plurality of techniques to identify the certain location within the executable code.

14. The one or more storage media of claim 13, wherein the memory management property is based on dynamic compilation with a virtual machine, and one of the plurality of techniques comprises:
identifying one or more methods of interest from bytecodes of the user process; and
for each method of interest of the one or more methods of interest, inserting one or more hooks into the bytecode before or after the method, each hook of the one or more hooks being configured to invoke an instrumented native user-level function as a call-out.

15. The one or more storage media of claim 13, wherein the memory management property is based on dynamic compilation with a virtual machine, wherein the one of the plurality of techniques comprises:
loading an agent into a programming environment of the user process and executing the agent in the programming environment, the agent being configured to identify one or more methods of interest from the user process;
for each method of interest of the one or more methods of interest:
determining a Java Native Interface (JNI) routine; and
inserting, into the user process at the certain location, a hook that is associated with the JNI routine.

16. The one or more storage media of claim 15, wherein determining the JNI routine comprises:
determining whether to use an already-loaded JNI routine; and
in response to determining to not use an already-loaded JNI routine, loading a new JNI routine, wherein the JNI routine is the new JNI routine.

17. The one or more storage media of claim 15, wherein the JNI routine is a first JNI routine, the hook is a first hook, and the certain location is a first location, the method further comprising:
determining a second JNI routine; and
inserting, into the user process at a second location that is different than the first location, an end hook that is associated with the second JNI routine.

* * * * *